(12) United States Patent
Grenfell

(10) Patent No.: US 8,624,893 B2
(45) Date of Patent: Jan. 7, 2014

(54) SYSTEM AND METHOD FOR GENERATING 2D TEXTURE COORDINATES FOR 3D MESHED SURFACES

(75) Inventor: Desmond T. Grenfell, Rossendale (GB)

(73) Assignee: Adobe Systems Incorporated, San Jose, CA (US)

( * ) Notice: Subject to any disclaimer, the term of this patent is extended or adjusted under 35 U.S.C. 154(b) by 1134 days.

(21) Appl. No.: 12/533,713

(22) Filed: Jul. 31, 2009

(65) Prior Publication Data

US 2013/0328870 A1 Dec. 12, 2013

(51) Int. Cl.
*G06T 17/00* (2006.01)
*G06T 15/00* (2011.01)
*G06K 9/36* (2006.01)

(52) U.S. Cl.
USPC ............................................ 345/420

(58) Field of Classification Search
USPC ................................. 345/420, 423
See application file for complete search history.

(56) References Cited

U.S. PATENT DOCUMENTS

| | | | | | |
|---|---|---|---|---|---|
| 5,488,692 | A | * | 1/1996 | Karasick et al. | 345/420 |
| 5,878,174 | A | * | 3/1999 | Stewart et al. | 382/293 |
| 6,009,190 | A | * | 12/1999 | Szeliski et al. | 382/154 |
| 6,081,273 | A | * | 6/2000 | Weng et al. | 345/420 |
| 6,157,747 | A | * | 12/2000 | Szeliski et al. | 382/284 |
| 6,850,233 | B2 | * | 2/2005 | Hoppe et al. | 345/420 |
| 6,909,801 | B2 | | 6/2005 | Wenzel et al. | |
| 7,149,368 | B2 | * | 12/2006 | Tong et al. | 382/285 |
| 7,224,356 | B2 | * | 5/2007 | Zhou et al. | 345/419 |
| 7,576,738 | B2 | * | 8/2009 | Litke et al. | 345/420 |
| 2004/0108999 | A1 | * | 6/2004 | Martin | 345/423 |
| 2005/0128211 | A1 | * | 6/2005 | Berger et al. | 345/582 |
| 2005/0270285 | A1 | * | 12/2005 | Zhou et al. | 345/420 |
| 2006/0013505 | A1 | * | 1/2006 | Yau et al. | 382/285 |
| 2006/0101103 | A1 | | 5/2006 | Guenter | |
| 2006/0267978 | A1 | * | 11/2006 | Litke et al. | 345/419 |

FOREIGN PATENT DOCUMENTS

EP 1000409 B1 * 6/2003

OTHER PUBLICATIONS

Kai Hormann, Bruno Levy, Alla Sheffer, "Mesh parameterization: theory and practice", ACM SIGGRAPH 2007 courses, Aug. 5-9, 2007, San Diego, California, 122 pages.*

Sunil Arya, David M. Mount, Nathan S. Netanyahu, Ruth Silverman, and Angela Y. Wu. 1998. An optimal algorithm for approximate nearest neighbor searching fixed dimensions. J. ACM 45, 6 (Nov. 1998), 891-923.*

(Continued)

*Primary Examiner* — Tize Ma
(74) *Attorney, Agent, or Firm* — Kilpatrick Townsend & Stockton LLP

(57) ABSTRACT

Systems and methods for generating 2D texture coordinates for 3D surfaces meshes may assign initial 2D texture coordinates to each node within a mesh using dead reckoning, compute a conformal mapping solution to revise the texture coordinates dependent on the initial mapping, and store the texture coordinates for subsequent use in a graphics application (e.g., applying a texture and/or re-meshing a surface). The methods may include designating one node as the origin, determining the shortest distance from each other node to the origin, and computing texture coordinates for each other node in order of increasing distance to the origin. The dead reckoning operation may compute texture coordinates of each node dependent on the distance and direction of a vector formed between the node and a neighbor node to which texture coordinates have already been assigned. Isometric terms reflecting stretching or compression may be introduced following convergence by the conformal mapping.

23 Claims, 18 Drawing Sheets

(56) References Cited

OTHER PUBLICATIONS

Alliez, et al., Recent Advances in Remeshing of Surfaces, pp. 53-78, in Shape Analysis and Structuring, Springer, Nov 28, 2007 - 296 pp., retrieved from: http://www.springerlink.com/content/gt75t2127r4uttuw/fulltext.pdf.*

M. M S. Floater and K. Hormann, "Surface parameterization: a tutorial and survey", In Advances in Multiresolution for Geometric Modelling, Mathematics and Visualization, pp. 157-186, Springer, 2005.*

Gu, Xianfeng; "Parameterization for Surfaces with Arbitrary Topologies", PhD Dissertation, Harvard University, Division of Engineering and Applied Science, Dec. 2002, 134 pages.*

Greenspan, M.; Godin, G.; "A nearest neighbor method for efficient ICP", Proceedings of the Third International Conference on 3-D Digital Imaging and Modeling, 2001, pp. 161-168, May 28-Jun. 1, 2001.*

Haker, S.; Angenent, S.; Tannenbaum, A.; Kikinis, R.; Sapiro, G.; Halle, M.; "Conformal surface parameterization for texture mapping," IEEE Transactions on Visualization and Computer Graphics, vol. 6, No. 2, pp. 181-189, Apr.-Jun. 2000.*

Wei Hong, Xianfeng Gu, Feng Qiu, Miao Jin, and Arie Kaufman. 2006, "Conformal virtual colon flattening", Proceedings of the 2006 ACM symposium on Solid and physical modeling (SPM '06). ACM, New York, Ny, USA, 85-93.*

Liliya Kharevych, Boris Springborn, and Peter Schroder, 2006, "Discrete conformal mappings via circle patterns", ACM Transactions on Graphics (TOG), vol. 25, Issue 2, Apr. 2006, pp. 412-438.*

Rovatti, R.; Mazzini, G.; , "On the Nearest Neighbor of the Nearest Neighbor in Multidimensional Continuous and Quantized Space," Information Theory, IEEE Transactions on , vol. 54, No. 9, pp. 4069-4080, Sep. 2008.*

Alla Sheffer, Bruno Levy, Maxim Mogilnitsky, and Alexander Bogomyakov, 2005, "ABF++: fast and robust angle based flattening", ACM Transactions on Graphics, vol. 24, No. 2, Apr. 2005, pp. 311-330.*

Lexing Ying , Aaron Hertzmann , Henning Biermann , Denis Zorin, "Texture and Shape Synthesis on Surfaces", Proceedings of the 12th Eurographics Workshop on Rendering Techniques, pp. 301-312, Jun. 25-27, 2001.*

Mathieu Desbrun et al, "Intrinsic Parameterizations of Surface Meshes," Eurographics vol. 21 (2002), No. 2 , 10 pages.

Patrick Mullen, Yiying Tong, Pierre Alliez, Mathieu Desbrun, "Spectral Conformal Parameterization," Eurographics Symposium on Geometry Processing 2008, vol. 27, No. 5, 8 pages.

* cited by examiner

SYSTEM AND METHOD FOR GENERATING 2D TEXTURE COORDINATES FOR 3D MESHED SURFACES

BACKGROUND

Description of the Related Art

In recent years, image manipulation and graphical editing programs have become increasingly popular. Image editing may be defined as the process of altering digital images or illustrations. Digital image editing applications, executed on a computing device, may be the primary tool used to manipulate, enhance, transform, create and render images, such as digital photographs and computer art. Example implementations of image editing applications include Adobe Photoshop™ and Adobe Photoshop Express™, among other image editing programs. Image editors are widely used to perform transformation or image adjustment operations on digital images, such as rotating, cropping and selectively changing colors.

As computing power has increased, the popularity and accessibility of three dimensional (3D) models and images have also increased. For example, a surface mesh may be used to model a 3D object in a graphics application (e.g., an image editing application or another application that displays a representation of a 3D object). A surface mesh representation may include a collection of points (represented by 3D coordinates), lines (each defined by two points), and triangles (each defined by three points or three lines). A graphics application may include a texture mapping function, whereby a user may specify a texture to be applied to a 3D image object modeled by a surface mesh. Such textures are typically modeled as a two-dimensional (2D) texture map representing "sheet" of elastic material, i.e. one that can be attached to, or wrapped around, the surface mesh to produce the desired result. For example, a texture map may be represented by 2D digital image data (e.g., an image depicting wood grains, stone, printed fabric, animal skin, etc.) In order to attach a 2D texture map to a 3D surface mesh, each node of the surface mesh must be mapped to a corresponding 2D texture coordinate pair.

Models created for manufacturing purposes as well as those derived from 3D scans typically do not contain texture coordinates suitable for texture mapping, and often include no texture coordinates at all. Previous techniques for generating 2D texture coordinates for a 3D surface mesh typically involve projection, whereby 2D texture coordinates are derived from 3D spatial coordinates by projecting the spatial coordinates on to a 2D plane whose orientation is chosen to maximize the projected area. The resulting projection includes a point for each node of the 3D surface model, according to where it falls in the projection. Projection methods typically provide good results only for relatively flat surfaces. If the surface includes peaks and troughs, however, a texture applied using texture coordinates generated through projection will be very badly stretched and/or compressed on the sides of those peaks and troughs, producing visually displeasing results.

SUMMARY

Systems, methods, and computer-readable storage media for generating 2D texture coordinates for 3D surfaces meshes are presented. When 2D texture coordinates generated using the techniques described herein are used for attaching textures represented by 2D digital images to 3D objects, the resulting images may include seam-free, natural looking texture maps with minimum edge-length distortions for a wide range of meshes. In some embodiments, these techniques may be applied in a rapid and unsupervised (i.e. automated) manner, such as by program instructions executing on one or more CPUs or CPUs in the system. In some embodiments, the 2D texture coordinates generated using these techniques may be stored for later use. For example, the 2D texture coordinates may be stored in a data structure that associates a 2D coordinate pair with each node in a 3D surface mesh. This metadata may be accessed by an image editing operation of a graphics application through which a texture is applied to an object in 3D space, and/or may be delivered with image data representing the object for subsequent operation using the same application or another graphics application. In another example, 2D texture coordinates generated using one or more of the techniques described herein may in some embodiments be used in a re-meshing operation for 3D object data. For example, these techniques may be used to improve the accuracy and/or reduce the storage requirements of a 3D surface mesh model of a real-world object generated by a 3D scanner.

In some embodiments, the system may be configured to access data representing a surface mesh model of a 3D object, assign initial 2D texture coordinates to each node within the surface mesh, compute a conformal mapping solution to generate revised 2D coordinates for each node within the surface mesh dependent on the initial 2D texture coordinates, and store the initial and/or revised 2D texture coordinates for subsequent use in a graphics application. In some embodiments, the system may be configured to designate a given node of the surface mesh as the origin node, determine a respective distance from each node within the surface mesh (other than the origin node) to the origin node on a shortest path to the origin node along one or more edges of the surface mesh, determine an ordering of the nodes within the surface mesh in terms of their increasing distance to the origin node, and compute 2D texture coordinates for each node (other than the origin node) in the determined order.

In some embodiments, the initial 2D texture coordinates may be computed using a dead reckoning type operation. The dead reckoning type operation may compute the texture coordinates of each node (other than an origin node) dependent on a distance and direction of a vector formed between the node and a neighbor node within the surface mesh to which texture coordinates have already been assigned. For example, the dead reckoning type operation may include, for each given node other than the origin node and a nearest neighbor of the origin node: identifying a nearest neighbor of the given node to which texture coordinates have already been assigned, identifying a nearest neighbor of the nearest neighbor to which texture coordinates have also been assigned, and computing the texture coordinates of the given node dependent on the texture coordinates of the nearest neighbor and the texture coordinates of the nearest neighbor of the nearest neighbor.

In some embodiments, computing a conformal mapping solution may include applying an iterative linear solver to simultaneous Beltrami-Laplace equations for each node within the mesh until a pre-determined number of iterations have been performed, a pre-determined period of time has passed, or a pre-determined measure of accuracy has been reached. In some embodiments, subsequent to said computing a conformal mapping solution, the system may be configured to introduce terms representing a deviation of the texture mapping from an isometric mapping and apply a non-linear solver to iteratively modify the texture coordinates with the intention of minimizing these deviations in a global least squares sense.

As noted above, in some embodiments, the system may be configured to perform a re-meshing operation to generate a modified surface mesh model of the 3D object using the conformal mapping solution as an input. For example, a triangulation operation may be applied to the results of the conformal mapping operation to produce the modified surface mesh representation. In other embodiments, the system may be configured to attach a texture represented by a 2D texture map to the 3Dobject according to the initial 2D texture coordinates, or revised 2D texture coordinates, or the further refined 2D texture coordinates for each node, and to render an image comprising the 3D object in which the texture is attached to the surface of the three-dimensional object. For example, the techniques described herein for generating 2D texture coordinates for a 3D surface mesh may be invoked in response to receiving input indicating that a texture map is to be applied to the 3D object (e.g., through a graphical user interface of a graphics application). In some embodiments, prior to generating and/or assigning 2D texture coordinates to the nodes of a 3D surface mesh, data representing the surface mesh may be pre-processed to produce a surface mesh representation that is well-oriented, non-degenerative, and simplicial.

The methods described herein may be implemented as program instructions, (e.g., stored on computer readable storage media) executable by a CPU and/or GPU, in various embodiments. For example, they may be implemented as program instructions that, when executed, implement a texture mapping operation for a 3D object represented by a 3D surface mesh (including assigning of initial, revised, and/or further refined 2D texture coordinates) or a re-meshing operation for such a 3D surface mesh in a graphics application in response to user input. In some embodiments, the 3D object on which to apply these operations may be selected by a user, e.g., through a user interface of the graphics application. In some embodiments, various parameters of the texture mapping operation and/or the re-meshing operation may be specified by the user (e.g., through such a user interface).

Figure 1A:
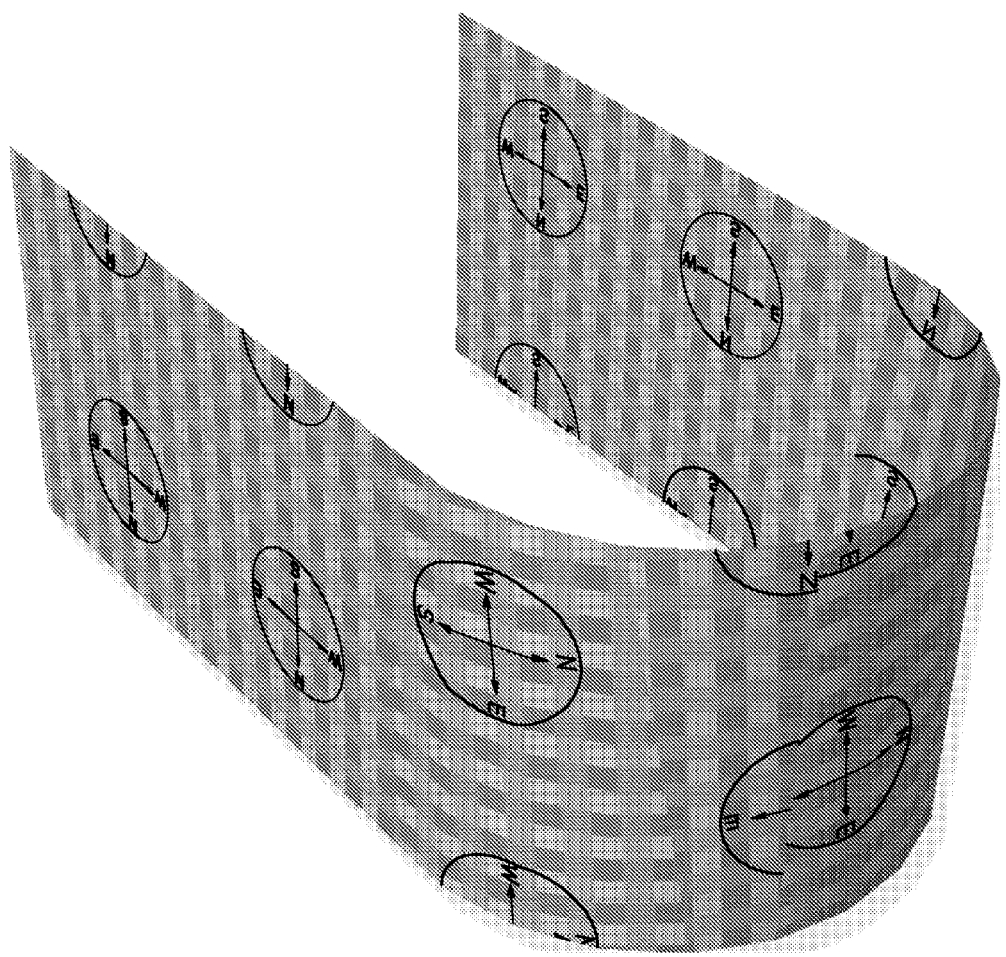
FIGS. 1A-1B illustrate 2D representations of a 3D surface having only external curvature on which a texture has been attached, according to some embodiments.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, digital image editing applications, executed on a computing device, may be the primary tool used to manipulate, enhance, transform, create and render images, such as digital photographs and computer art. Digital image editing applications may be used to render and modify three-dimensional (3D) objects or images, according to various embodiments described herein. As used herein, the terms 3D surface mesh, 3D graphics models, and 3D image may be used interchangeably, where all three may refer to a set of 3D polygons representing a 3D object, which may or may not be rendered by a 3D rendering engine.

In order to attach a two-dimensional (2D) texture map to a 3D object represented by a 3D surface mesh, each node of the surface mesh must be mapped to a corresponding 2D texture coordinate pair. However, when 3D graphics models are imported into a 3D image editing tool, such a 2D representation may not be provided, or a 2D representation that is provided may be unacceptable or unusable for mapping textures onto the 3D objects. The systems and methods described herein may be used to generate and assign 2D texture coordinates to each node of a surface mesh embedded within a 3D space, e.g., for application of 2D texture maps to the 3D graphics model or image. The availability of such coordinates may allow various types of textures, including digital images, to be attached to the surface of a 3D object and (within the context of a computer graphics system) may provide a more realistic visualization of the textured surface. The use of these methods in computer graphics applications may enable realistic visualizations of 3D models to be created with little user effort. In addition, they may facilitate the re-meshing of complex meshes, such as those derived from 3D scanners, so that the surfaces they describe are optimized for accuracy and storage space, in some embodiments.

Previous graphics applications provide a small number of options for generating or re-parameterizing texture coordinates. Typically, the coordinates are generated based on a simple projection technique, as described above. In some cases, these projection-based coordinates may be optimized to minimize either distortions due to stretching or the number of texture discontinuities (i.e. seams). Neither of these options provides a reliable solution to real world texture mapping problems, as illustrated by the examples in FIGS. 1A-1B, and 2A-2B.

As used herein, a surface may be said to exhibit only "external curvature" if it includes curvature that does not result in stretching or compression of a texture map when applied to the surface. For example, a texture map may be thought of as representing a flat (i.e. two-dimensional) sheet of printed paper or fabric. If such a texture map can be attached to the surface of a 3D object or wrapped around the surface of a 3D object without being stretched or compressed, the surface may include only external curvature.

For example, the surface of a cylinder exhibits only external curvature (and may be wrapped with a 2D texture map without stretching or compression of the texture map). In another example, a flag waving in the wind may not actually include external curvature, but may be treated as a surface having only external curvature in the context of an exercise to map a 2D texture map onto the flag. Existing techniques, such as the simple projection techniques described above, may not produce texture coordinates that result in realistic texture mapping for even these simple examples. Surfaces for which a texture mapping operation may be required to stretch and/or compress a 2D texture map to apply it to the surface (e.g., the surface of a sphere) may be said to exhibit intrinsic, or internal, curvature. In such cases, texture mapping based on projection techniques typically produces unrealistic results that include distortions and/or unwanted seams.

Figure 1B:
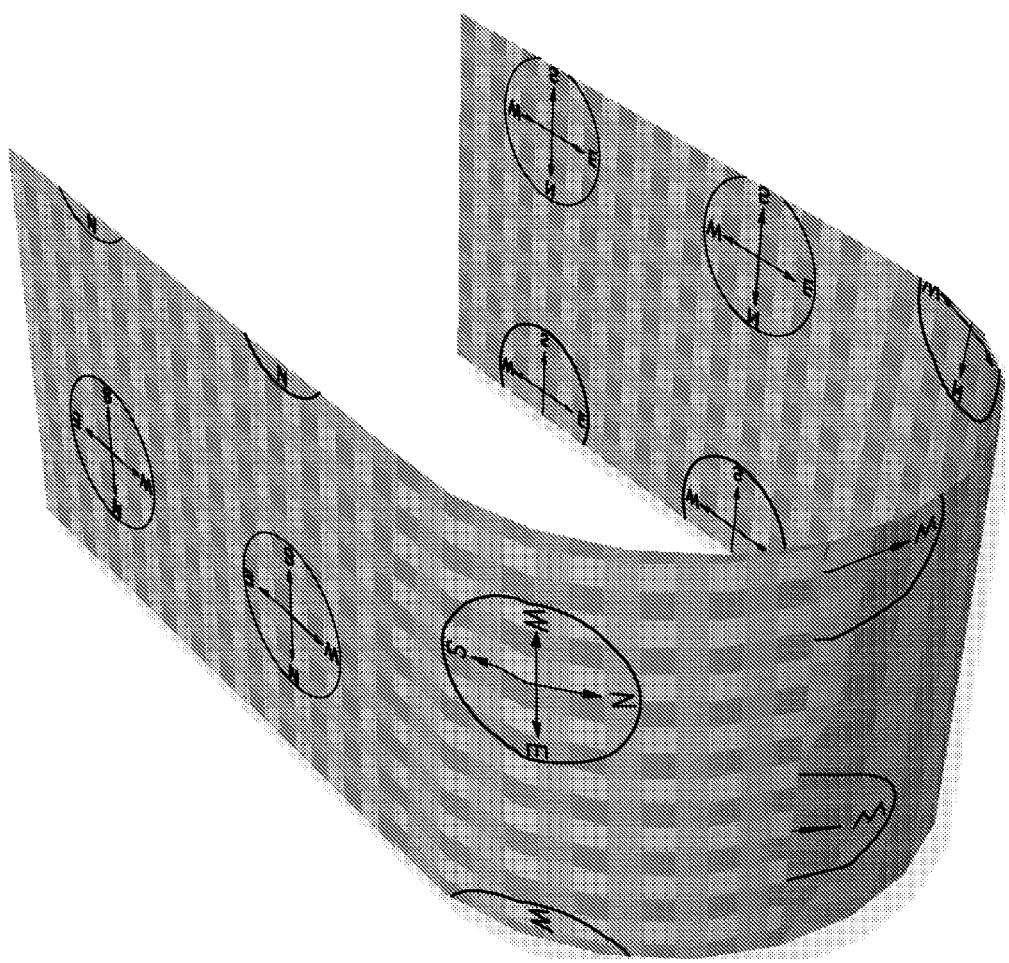

FIGS. 1A and 1B illustrate sample images of an object exhibiting only external curvature to which a texture map has been attached according to a set of 2D texture coordinates generated from a surface mesh representation. The images illustrated in FIGS. 1A-1B were generated using a type of planar projection for an initial 2D coordinate mapping. The texture coordinates for the image in FIG. 1A were then optimized to minimize the number of seams in the textured image, while the texture coordinates for the image in FIG. 1B were optimized to minimize the distortion due to stretching. In the images illustrated in FIGS. 1A-1B, the compass symbols indicate the orientation of the texture map attached to the objects. As illustrated in these figures, a 2D coordinate mapping based on simple projection may introduce significant distortion and may result in texture coordinates that are inconsistently oriented (as evidenced by the inconsistently oriented compass symbols of the attached texture maps), yielding an unnatural looking final image.

Figure 2A:
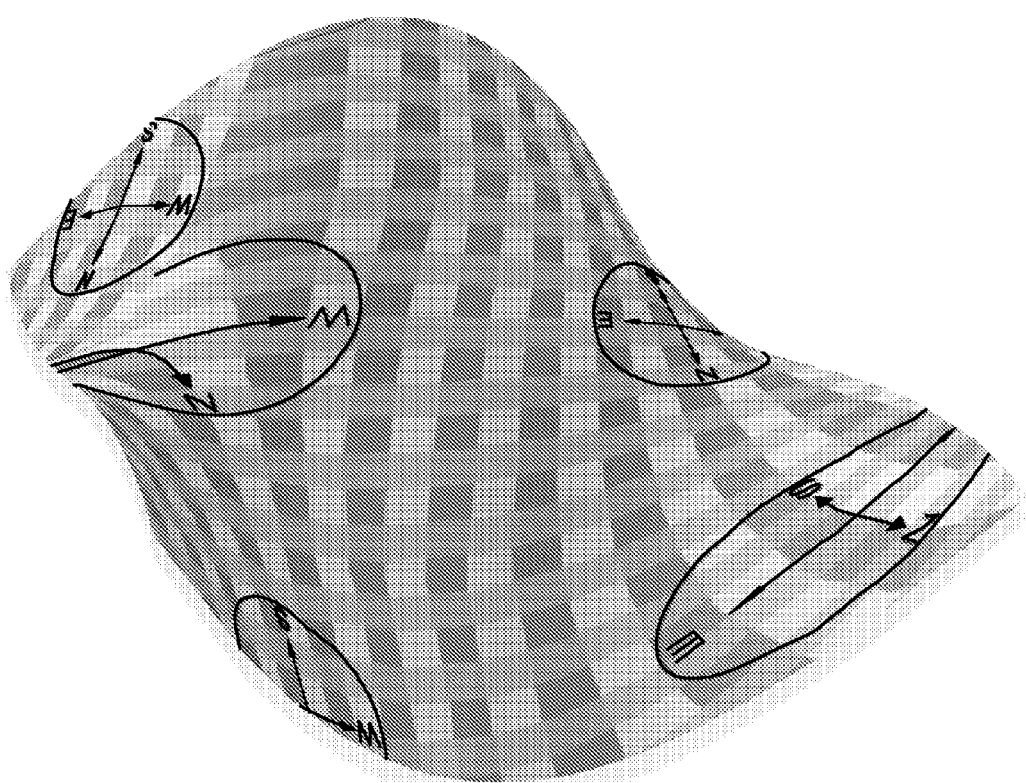
FIGS. 2A-2B illustrate 2D representations of a 3D surface having intrinsic curvature on which a texture has been attached, according to some embodiments.
Figure 2B:
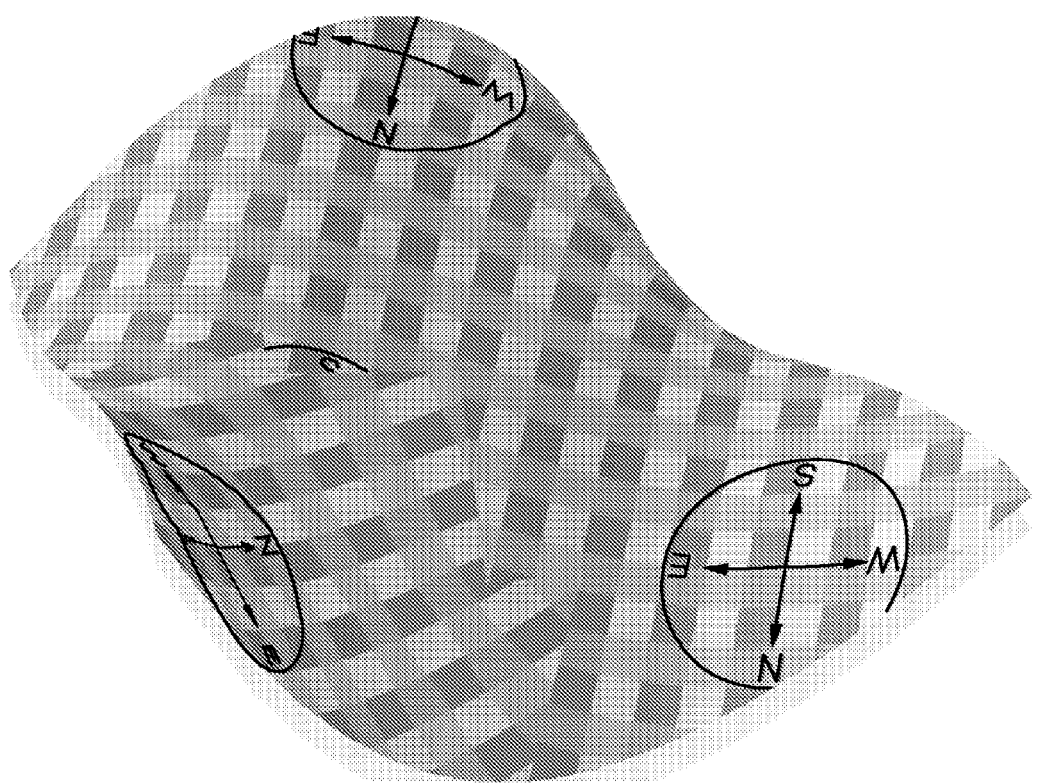

FIGS. 2A and 2B illustrate sample images of an object having both external curvature and intrinsic (internal) curvature to which a texture map has been attached according to a set of 2D texture coordinates generated from a surface mesh representation. These images were also generated using a type of planar projection for an initial 2D coordinate mapping. The texture coordinates for the image in FIG. 2A were then optimized to minimize the number of seams in the textured image, while the texture coordinates for the image in FIG. 2B were optimized to minimize the distortion due to stretching. In the images illustrated in FIGS. 2A-2B, the compass symbols indicate the orientation of the texture map attached to the objects. As illustrated in these figures, a 2D coordinate mapping based on simple projection may introduce significant distortion and may result in texture coordinates that are inconsistently oriented (as evidenced by the inconsistently oriented compass symbols of the attached texture maps), yielding an unnatural looking final image.

The system and methods described herein may address the problem of assigning a smooth and continuous mapping between the points forming a surface embedded in a 3D space and points forming a disk-like region of the Euclidean plane. The methods described herein may minimize the distortion within the mapping with respect to angle preservation (i.e. conformal optimization) and/or distance preservation (i.e. isometric optimization), in various embodiments. Note that in a perfect conformal mapping solution, an angle measured between two infinitesimal vectors in a 2D representation will be the same as the angle measured between the corresponding vectors in the 3D surface mesh. This property may hold even for surfaces that include intrinsic curvature.

In contrast to previous solutions for generating 2D texture coordinates, the system and methods described herein may produce seam-free, natural looking texture maps with minimum edge-length distortions in a fast and unsupervised (i.e. automated) manner for a wide range of meshes, including those containing many thousands of points. The system and methods described herein may be applied generally within various graphics applications to generate texture maps that would improve the realism of 3D renderings, in various embodiments. In some embodiments, they may be applied in applications that support 3D capture and processing, e.g., in the context of re-meshing 3D surfaces.

The system and methods described herein may be used to assign a 2D dimensional coordinate to each point in an open surface embedded within a 3D space, such that a smooth and continuous mapping (a diffeomorphism) is obtained from such a surface to a disk like region of the Euclidian Plane. In some embodiments, the texture space may be modeled as a normalized texture space in which the texture coordinates are represented by a (u,v) or (s,t) coordinate pair, according to various conventions. In such embodiments, the methods described herein may be used to assign values between 0 and 1 to each of the elements of the texture coordinate pair corresponding to a given node in the 3D surface mesh.

The methods described herein may produce good results for any surface that is described (or that can be described) by a well-oriented, non-degenerate, simplicial-complex of nodes, edges and faces with an Euler characteristic of 1, where the term "well-oriented" refers to the property that all triangles are defined in the same orientation. Such surfaces are commonly encountered in computer based engineering and computer graphics. Surface meshes for which these methods are particularly well suited may consist of a complex of nodes, edges and faces having an overall disk-like topology with a single continuous outer perimeter. As described above, nodes of such surface meshes correspond to points in 3D space with given coordinates, edges correspond to straight line segments defined by two end nodes, and faces are defined by either three points or three connected edges within the surface mesh.

The system and methods described herein may in some embodiments be applied to non-simplicial meshes (e.g. those containing quadrilaterals) and to meshes containing degeneracies (e.g., coincident points) provided that these are first re-expressed in the preferred form. The methods may also be applied to surfaces of arbitrary topology but may not be guaranteed to provide acceptable results. In general, the methods described herein may produce good results for those surfaces that are equivalent to a disk or a punctured disk, rather than to a sphere or punctured sphere or to any object of higher order topology. In other words, the methods may produce the best results when applied to surfaces that can be cut and formed from a single sheet of elastic material with no joins (i.e. seams).

The methods described herein may include an operation similar to a type of "dead reckoning" whereby a position with respect to some initial starting position is maintained by recording the distance and direction of every step taken. For example, in some embodiments, computing the 2D texture coordinates of each node (other than an initial or origin node) may be dependent on texture coordinates previously computed and assigned by the technique for at least one other node within the mesh. More specifically, computing the 2D texture coordinates of a given node may be dependent on the distance and direction between the given node and a neighboring node, and on the distance and direction between that neighbor node and a neighbor node of that neighbor node. In some embodiments, provided that the embedded surface represented by a surface mesh has no intrinsic curvature and subject to numerical accuracy, the coordinates assigned to any given point within the surface mesh by a naive dead reckoning type operation will be independent of the path used to reach that point. However, for a more general surface that does possess some intrinsic curvature, a coordinate assigned to a given point by a naive dead reckoning type operation may be dependent on the path taken to the point.

The system and methods described herein may in some embodiments provide a canonical solution addressing the issues associated with the path dependent texture-coordinates generated by a naive dead reckoning type algorithm. Specifically, in some embodiments, texture coordinates may be computed for the points (i.e. nodes) within the surface mesh in order of their distance from the origin, and texture coordinates of any point in the simplicial complex may be derived by dead reckoning along the shortest path between that point and the origin. This approach may be viewed as a parallel transport of the initial texture coordinate frame to every other point in the complex. In some embodiments, computing the texture coordinates for each node in order of distance from the origin, and applying a dead reckoning type operation along the shortest path between each point and the origin may ensure that the texture coordinates of any triangle will be consistently oriented (e.g., for the specific case of a surface with disk-type topology). For other surfaces, the possibility may exist that the advancing front created by the dead reckoning type operation (which tends to circle the origin) may touch itself and thereby generate triangles with inconsistently oriented texture coordinates. In practice, however, these badly oriented triangles may tend to lie along distinct boundaries, and may largely be regarded as natural or inescapable seams.

One method for generating 2D texture coordinates for a 3D meshed surface as described above is illustrated in FIG. 3. As shown in this example, the method may include accessing data representing a surface mesh in 3D space, as in 300. In some embodiments, the data may be accessed in response to input received from a user, e.g., through a graphical user interface (GUI). For example, a user may select a 3D object image and a texture to be added to the 3D object using a GUI of a graphics application that supports image editing operations. In response to invoking a texture mapping operation through the GUI, data representing a 3D surface mesh model of the 3D object may be accessed. As described above, if the surface mesh representation is not well-oriented, non-degenerate, and simplicial, it may be pre-processed to put it in better form for the application of the remaining operations. This is shown as 305.

Figure 3:
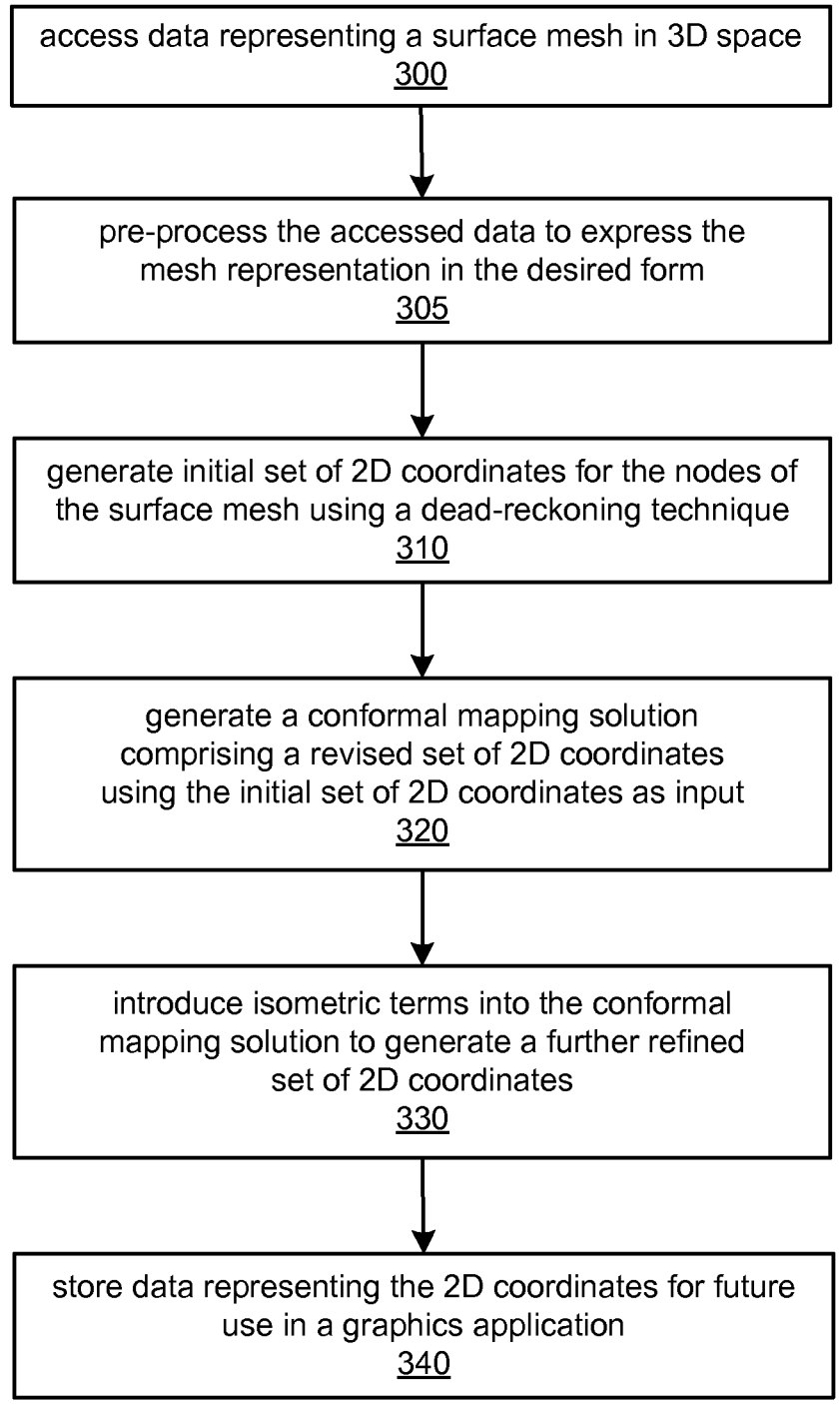
FIG. 3 is a flow diagram illustrating a method for generating 2D texture coordinates for a 3D meshed surface, according to some embodiments.
Figure 4A:
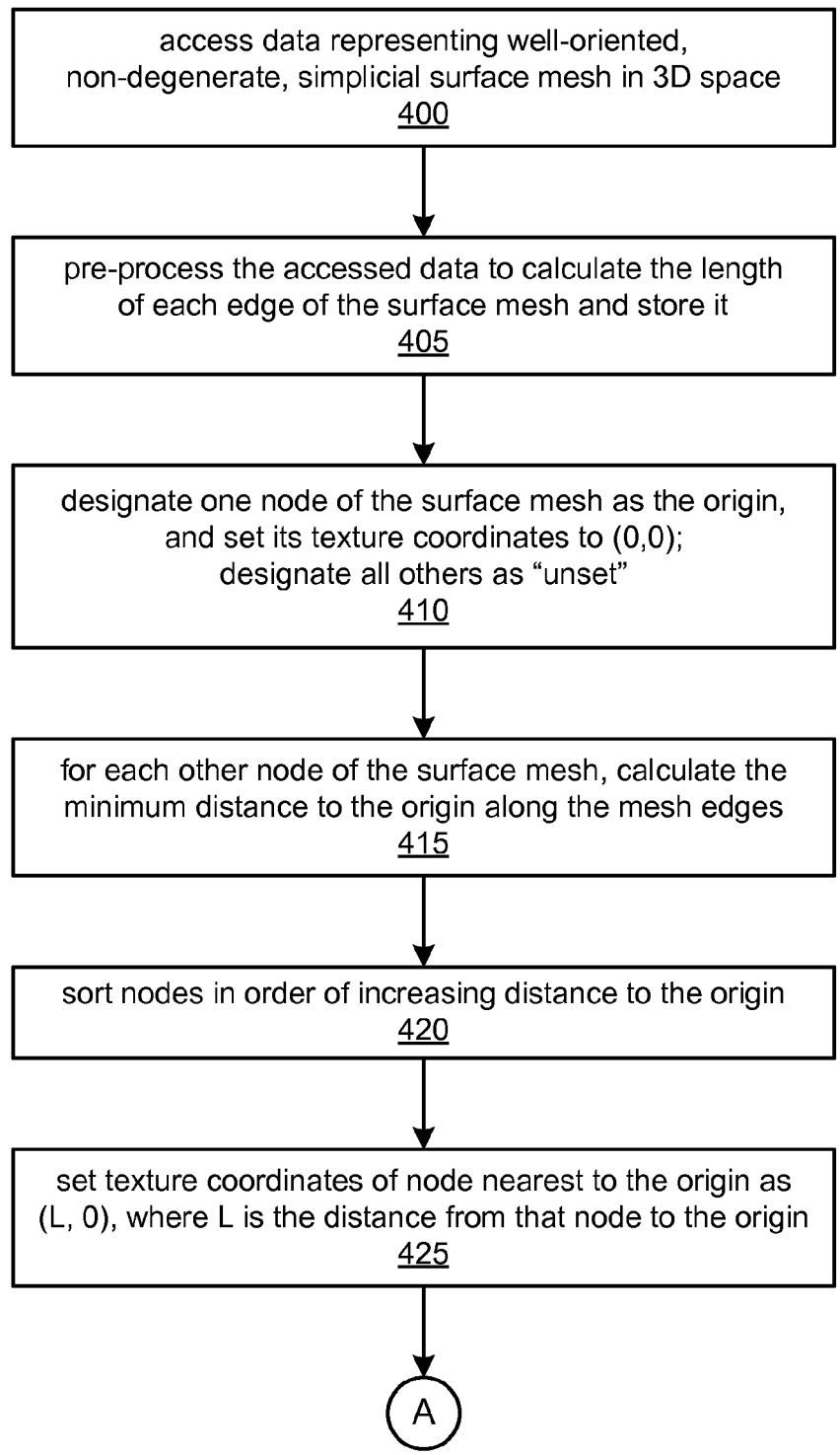
FIGS. 4A-4B constitute a flow diagram illustrating a method for generating an initial set of 2D texture coordinates for a 3D surface mesh using a dead reckoning type operation, according to some embodiments.
Figure 4B:
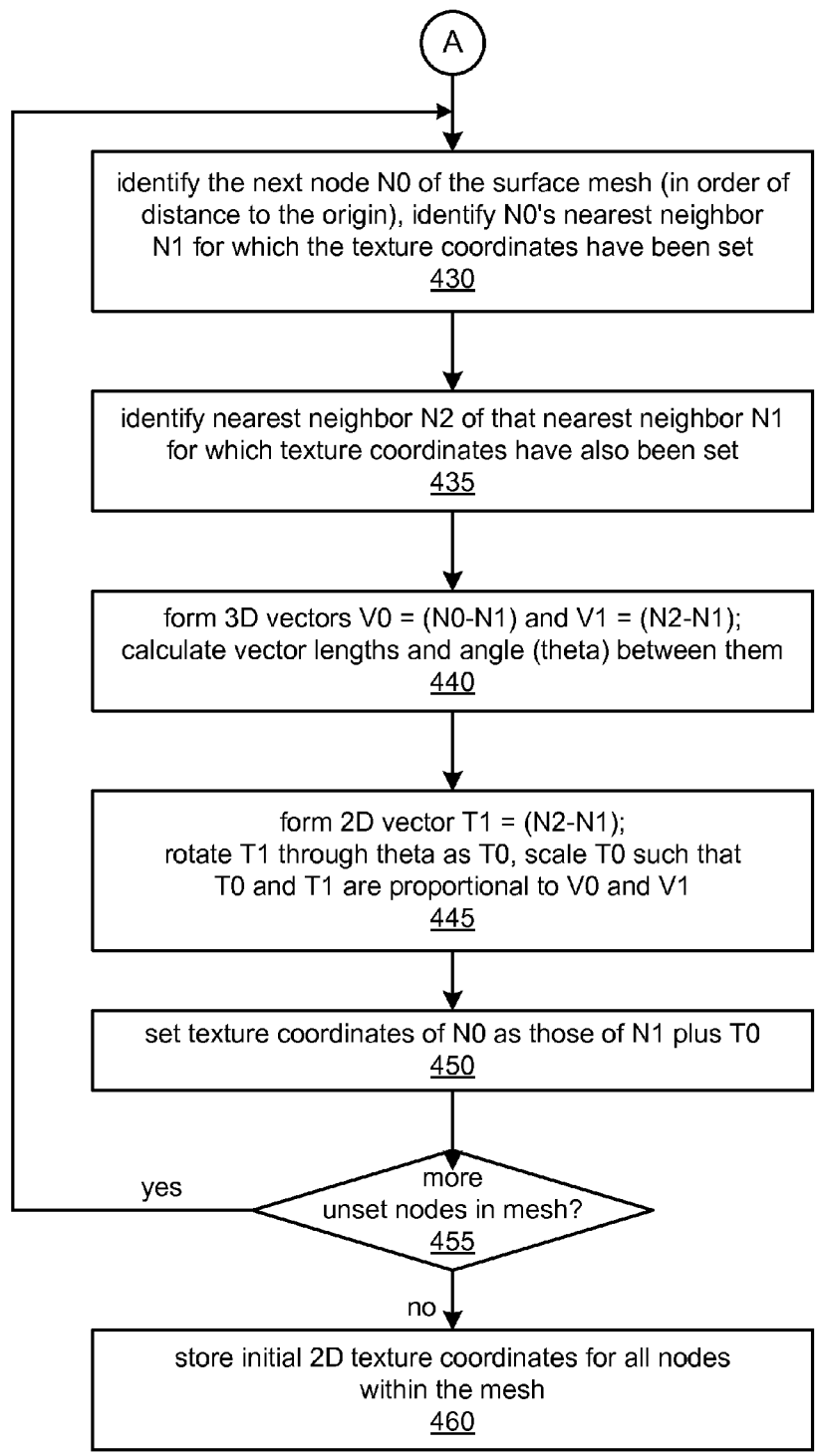

As illustrated in FIG. 3, the method may include rapidly and automatically generating an initial set of 2D texture coordinates for the nodes of the surface mesh using a variation of a dead reckoning technique, as in 310. As described above, computing the initial texture coordinates for each node other than an origin node may be dependent on texture coordinates previously computed and assigned for at least one other node within the mesh during the assignment exercise. For example, computing the texture coordinates of a given node may be dependent on the distance and direction of vectors formed between the given node and a neighbor node, and between the neighbor node and a neighbor node of that neighbor node. One embodiment of such a technique is illustrated in FIGS. 4A-4B and described in more detail below.

For surfaces of low intrinsic curvature, the dead reckoning type operation described herein may generate acceptable texture coordinates even when the embedded curvature of the 3D object modeled by the surface mesh is quite high. For example, it may produce acceptable results for a 3D surface mesh that models a flag flapping in the wind, which may have very low intrinsic curvature even though it is highly non-planar. For surfaces that do include significant intrinsic curvature, the dead reckoning type operation described herein may not produce the most desirable mapping, in some embodiments. In some embodiment, for both intrinsically curved and non-curved surfaces, the presence of a very small or rapidly varying mesh size (e.g., in a surface mesh having small, thin triangles and/or low angles) may give rise to unwanted artifacts in the mapping due to a build up of numerical inaccuracies. In other words, a small error in the calculation of a rotation angle at one point in the surface mesh may become magnified as the texture coordinate generation exercise processes nodes at points that are further and further away from that point.

To overcome distortions and inconsistencies that may be introduced in processing intrinsically curved surfaces as well as any limitations imposed by the use of finite precision arithmetic, the method may in some embodiments include a second phase, which aims to globally minimize the distortions in the mappings generated by the method as described so far. More specifically, the second phase seeks to minimize the inability of the initial mapping to preserve both angles and lengths in a global least-squares sense. Note that a mapping that preserves angles is said to be conformal, while a mapping that preserves distances is said to be isometric. It is also noted that while it is possible to obtain a perfectly conformal mapping for a surface without intrinsic curvature (e.g., for the cylinder and flag examples above) or for an intrinsically curved surface, it is only possible to obtain an isometric mapping for a surface with no intrinsic curvature. In some embodiments, the method described herein may be configured to optimize the texture coordinate mapping exercise toward a conformal solution or an isometric solution. For example, the method may rely on a pre-determined or default preference between the two solutions (e.g., for different contexts or for use in particular graphics applications), or such a preference may be specified by a user (e.g., through a GUI), in different embodiments.

Figure 6:
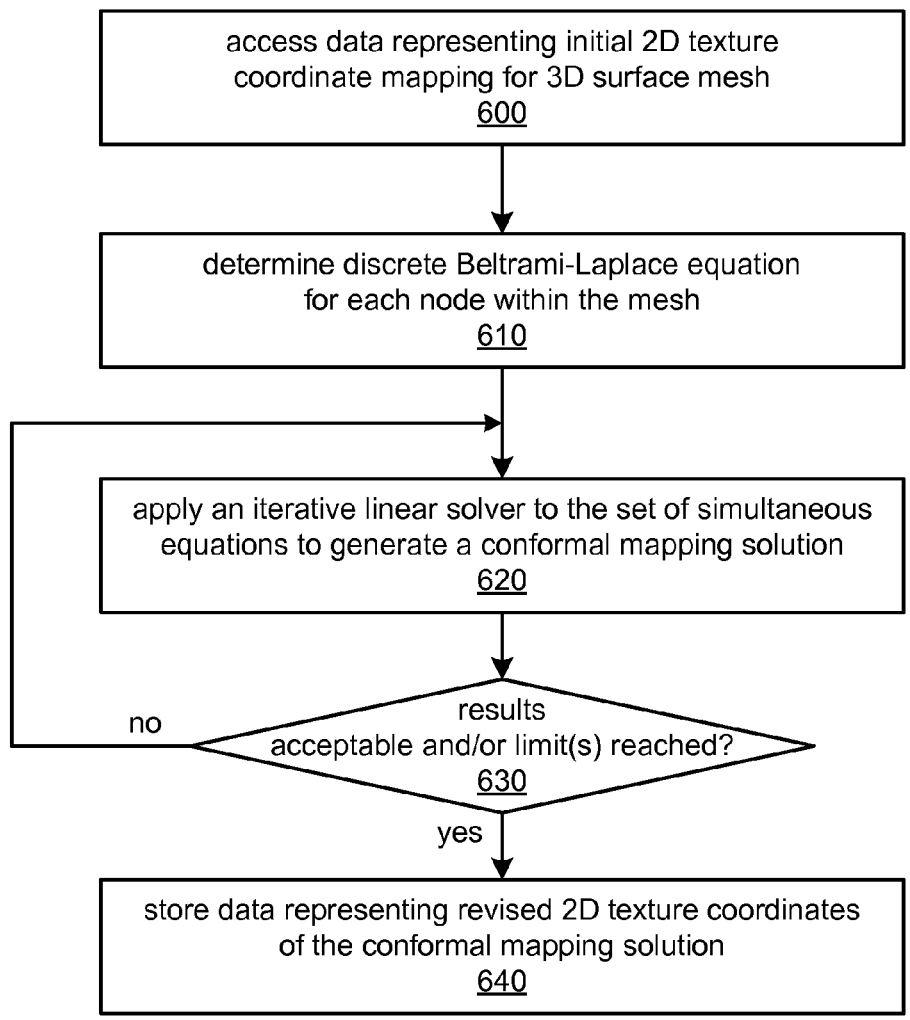
FIG. 6 is a flow diagram illustrating a method for generating a conformal mapping solution using an initial 2D texture coordinate mapping as input, according to some embodiments.

As illustrated in 320 of FIG. 3, the second phase of the method may include generating a conformal mapping solution comprising a revised set of 2D texture coordinates using the initial mapping described above as input. In other words, the method may include applying a conformal mapping operation to the texture solution obtained from the dead reckoning type operation described above. One embodiment of a method for generating a conformal mapping solution is illustrated in FIG. 6 and described in more detail below. Note that while a conformal texture coordinate mapping solution may result in some amount of stretching when a texture is applied to the object, the coordinate mapping is guaranteed to be a bijection (i.e. a mapping of surface mesh nodes to texture coordinate pairs that is one-to-one and onto) and to result in a consistent orientation when applying the texture to the object.

In order to preserve distances better when generating 2D coordinates for a 3D surface mesh that includes intrinsic curvature, (i.e. to reduce distortion due to stretching and compression when mapping 2D textures to such a surface mesh), non-linear isometric terms representing elastic energy may be added to the computation of the 2D texture coordinates. The addition of such terms may produce a result that is as close to an isometric solution as possible. As illustrated in FIG. 3, the method may include introducing isometric terms into the conformal mapping computations (e.g., after some number of iterations resulting in a reasonable conformal mapping solution), as in 330. In other words, the method may include applying an isometric mapping computation to the texture solution obtained from the conformal mapping operation described above. As described herein, introducing isometric terms into the computations after first converging on a reasonable conformal mapping solution may minimize distortions due to intrinsic curvature without falling into local minima.

Figure 7:
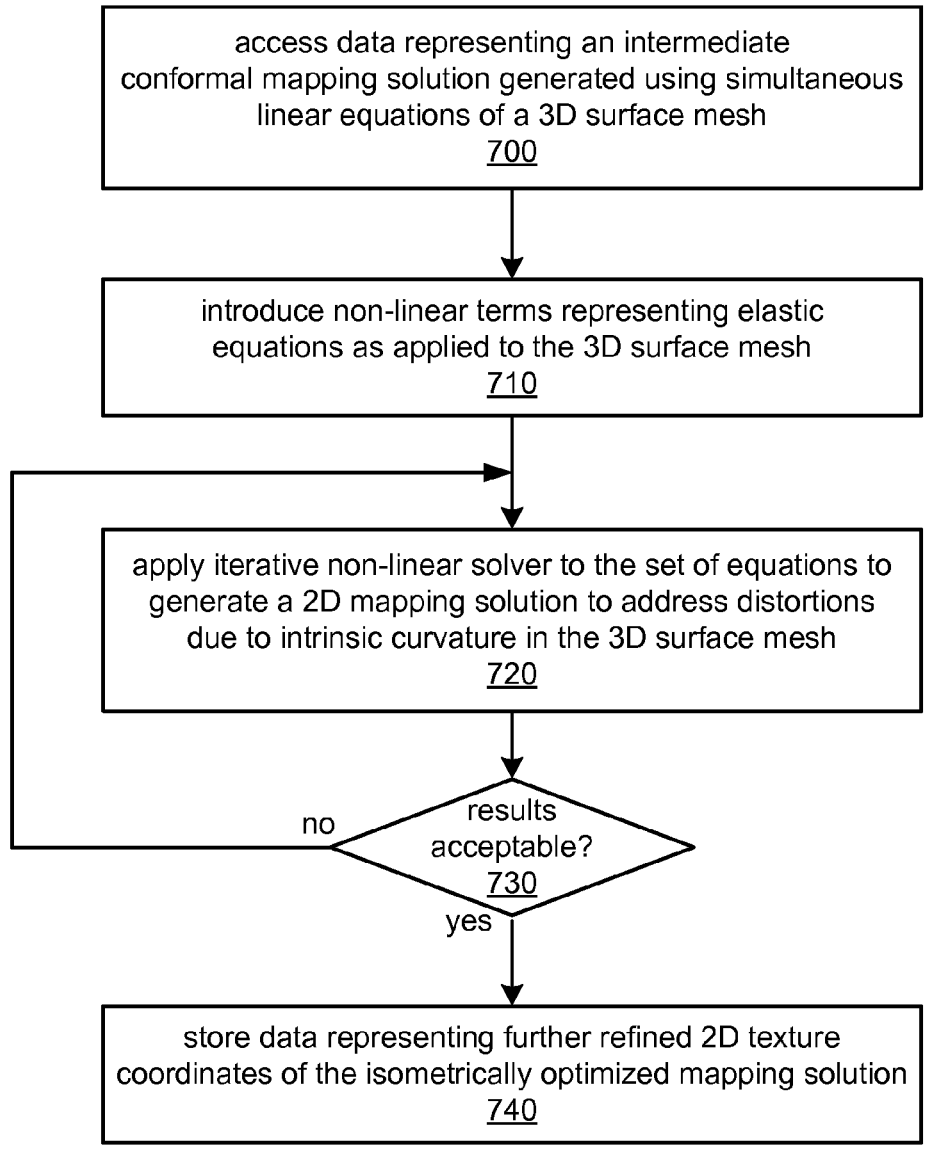
FIG. 7 is a flow diagram illustrating a method for including isometric terms in generating a 2D texture coordinate mapping, according to some embodiments.

In some embodiments, if isometric terms are introduced into the system of simultaneous equations before converging on a global solution, these non-linear terms may steer the solution toward one that is locally focused. In other words, in some embodiments, allowing a computation optimized toward a conformal solution to converge to (or very close to) a conformal mapping with good global optimization before introducing isometric terms may result in a more globally optimized solution. In some embodiments, the conformal mapping computations may be applied first reach a reasonable global solution very quickly (e.g., in 5-10 iterations), and then isometric terms may be added to the computations incrementally. On the other hand, if these non-linear intrinsic terms are introduced too early, they may destabilize the system of equations and the solution may never converge. Furthermore, the addition of these terms may slow down the iterative solver, since the coefficients for these non-linear terms may need to be re-calculated and re-linearized for each successive iteration. In some embodiments, if the computations are not close to converging on a global solution prior to the introduction of these non-linear isometric terms, the resulting solution may not be a bijection and may include texture coordinates that are not consistently oriented. One embodiment of a method for introducing isometric terms into a 2D texture coordinate mapping solution is illustrated in FIG. 7 and described in more detail below.

As illustrated in FIG. 3, by introducing isometric terms into the 2D texture coordinate mapping, the method may produce a further refined set of 2D texture coordinates, and may store data representing those 2D textures coordinates (e.g., the initial 2D texture coordinates, the revised texture coordinates and/or the further refined texture coordinates) for future use in a graphics application, as in 340. For example, data representing the 2D texture coordinates may be accessed by an image editing operation in response to invocation of a command to add texture to an object in an image. This data may be used to determine how and where to attach a selected texture map to the object, as described herein. In some embodiments, the initial 2D texture coordinates, the revised texture coordinates and/or the further refined texture coordinates may be stored in along with other metadata associated with the 3D object image data, including the data representing the surface mesh model of the 3D object. In some embodiments, such metadata, including 2D texture coordinates, may be provided along with the image data (e.g., in an image library) to be accessed any number of times by a graphics application having access to the image data.

In some embodiments, the method illustrated in FIG. 3 may be performed in response to invocation of a graphics editing operation specifying that a texture be added to a selected 3D object in an image. In some such embodiments, a user may be able to specify whether to apply the conformal and/or isometric optimization operations illustrated in 320 and 330 of FIG. 3 in response to observing the results of a texture mapping operation based on initial texture coordinates generating using the dead reckoning type operation described above and/or the results of the texture mapping operation following the performance of one or more of these additional operations. In other embodiments, the system may be configured to perform one or both of the second phase operations (i.e. conformal and/or isometric optimization)

based on a default configuration, an application-specific policy, or a determination of the types of curves exhibited by the target surface mesh.

One method for rapidly and automatically generating an initial set of 2D texture coordinates using a variation of a dead reckoning technique is illustrated in FIGS. 4A-4B, according to some embodiments. As shown in this example, computing the texture coordinates of each node other than an origin node may be dependent on texture coordinates previously computed for and assigned to at least one other node within the mesh. More specifically, computing the 2D texture coordinates of a given node may be dependent on the distance and direction between the given node and a neighboring node that is nearer to the origin than the given node, and on the distance and direction between that neighbor node and a neighbor node of that neighbor node. As illustrated in 400 of FIG. 4A, the method may include accessing data representing a well-oriented, non-degenerate, simplicial surface mesh in 3D space, as described above. In some embodiments, the method may include pre-processing the accessed data to calculate the length of each edge of the surface mesh (i.e. the edge between each pair of nodes) and to store these values for later use, as in 405.

As illustrated in 410 of FIG. 4A, the method may include designating a single node as the origin, setting its texture coordinates to (0,0), and designating the texture coordinates of all other nodes within the surface mesh as "unset" (e.g., in a data structure configured to store 2D texture coordinates for each node of the mesh). In general, any node may be designated as the origin, however in some embodiments the origin may be selected from among nodes on the perimeter of the mesh.

As illustrated in 415 of FIG. 4A, the method may include, for each node within the surface mesh other than the origin node, computing the minimum distance from the node to the origin. In some embodiments, the distance metric may be calculated as the sum of the Euclidian lengths of the edges on a path connecting the node to the origin. In some embodiments, any suitable computer algorithm (e.g., Dijkstra's shortest path algorithm) may be used to calculate the shortest path back through the triangular mesh. For example, in one embodiment, the minimum distances may be computed using a variation of the Dijkstra algorithm which executes in $O(V^2)$ time where V is the number of nodes in the mesh. The method may then include sorting the nodes (e.g., sorting a list of the nodes) in order of increasing distance from the origin, as in 420.

As illustrated in 425 of FIG. 4, the method may include identifying the node closest to the origin (excluding the origin itself), and setting the texture coordinates of that closest node to (L, 0) where L is the distance from the node to the origin, i.e. the pre-computed length of the edge connecting the origin to its nearest neighbor. This edge may correspond to one of the axes of the texture coordinate system being constructed (e.g., the u or s axis).

To determine initial texture coordinates for each of the remaining unset nodes in the mesh, the method may include processing those nodes in order of their distance from the origin, as follows:

At 430, identifying the next node whose texture coordinates are to be set in order of its distance to the origin, designated as N0, and identifying the nearest neighbor of N0 for which the texture coordinates have already been set, designated as N1.

At 435, identifying the nearest neighbor of N1 for which the texture coordinates have already been set, designated as N2.

At 440, forming 3D vectors V0=(N0−N1) and V1=(N2−N1), where the indices are applied to the 3D spatial coordinates of the nodes, and calculating the lengths of these vectors and the angle (Theta) between them.

At 445, forming a 2D vector T1=(N2−N1) where the indices are applied to the 2D texture coordinates of the set nodes N1 and N2; rotating T1 through an angle of Theta, where the transformed vector is designated as T0; and scaling T0 in proportion to the lengths of V0 and V1. This may result in the 2D vectors exhibiting the same proportions in the 2D mapping as the corresponding 3D vectors in the 3D surface mesh.

At 450, setting the texture coordinates of node N0 to those of N1 plus T0.

As illustrated by decision block 455 and feedback to block 430 in FIG. 4B, the method may include repeating the operations shown as 430-450 until texture coordinates have been set for all other unset nodes within the mesh. In other words, the method may include visiting each of the other nodes within the mesh in order of their distance from the origin, and computing texture coordinates for each one in turn using the operations illustrated in 430-450. Once texture coordinates have been set for all of the nodes within the mesh, shown as the negative exit from 455, the method may include storing the 2D texture coordinates for all of the nodes of the mesh, as in 460. For example, data may be stored in a data structure configured to store metadata representing the texture coordinate pair values in association with an identifier of each node of the mesh (e.g., as indexed by its distance from the origin, or using another suitable identifier of the node). As previously noted, these texture coordinates and/or other metadata may be provided to various graphics applications along with image data for the 3D object, in some embodiments. In some embodiments, the operations illustrated in FIGS. 4A-4B may be implemented by program instructions executing on one or more CPUs and/or GPUs, and may in some embodiments be executed rapidly enough to produce an initial set of 2D texture coordinates in real time.

Figure 5A:
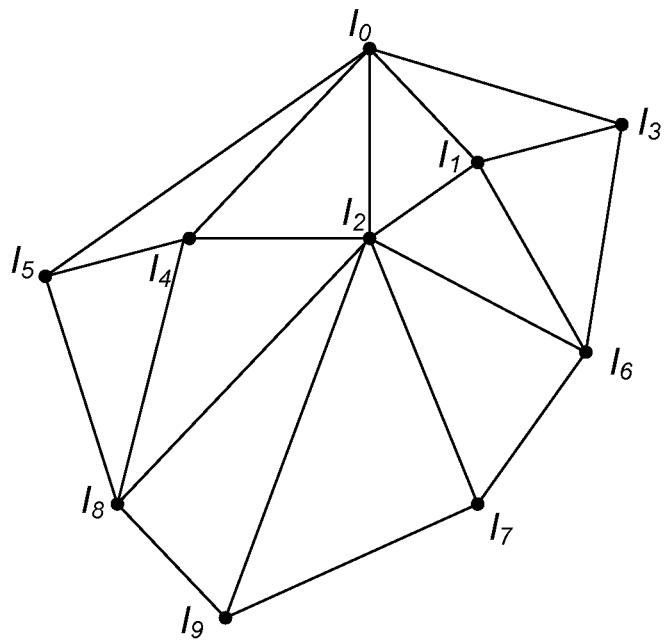
FIGS. 5A-5F illustrate the application of a dead reckoning type operation to a 3D surface mesh, according to some embodiments.

The method described above for generating an initial set of 2D texture coordinates for a 3D surface mesh may be further illustrated by way of the example illustrated in FIGS. 5A-5F. These figures illustrate the application of the dead reckoning type operation described herein to a portion of a 3D surface mesh, according to one embodiment. In this example, the portion of the surface mesh illustrated in FIGS. 5A-5F includes ten nodes, $I_0$-$I_9$. In FIG. 5A, the node designated as the origin is labeled $I_0$, and the remaining nodes are labeled as $I_x$, where the index (x) indicates the position of each node on a list of nodes ordered by increasing distance from the origin, $I_0$.

Figure 5B:
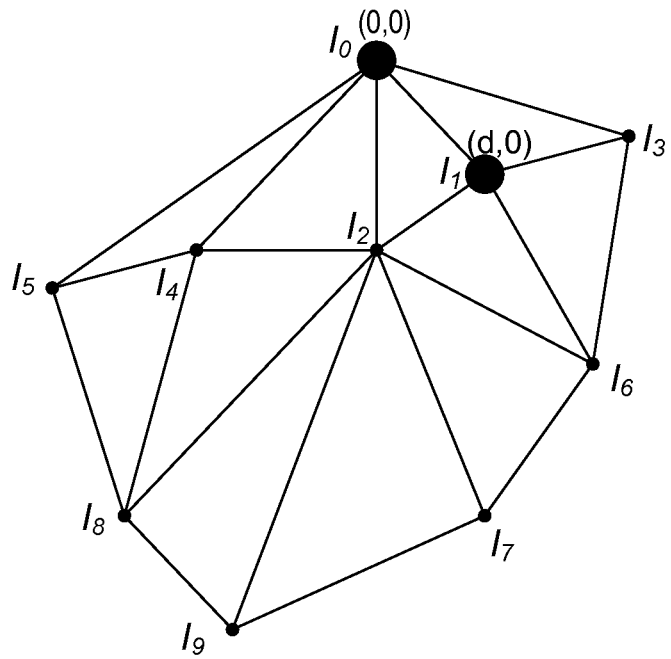
Figure 5C:
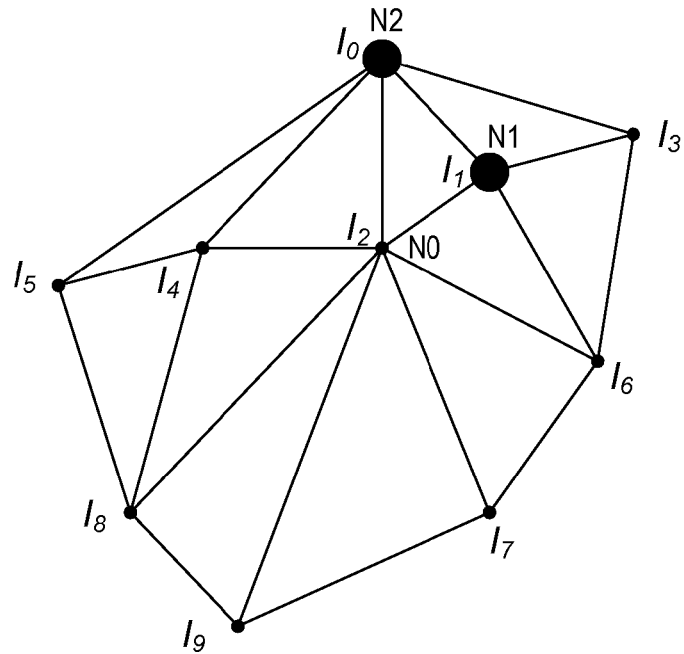

As described above, the method may include setting the texture coordinates of the origin node ($I_0$) to (0,0) and setting the initial texture coordinates of the node that is nearest to the origin node ($I_1$) to (d,0), where d is the distance between node $I_1$ and the origin $I_0$. This is illustrated in FIG. 5B, as labeled. In FIGS. 5B-5F, nodes for which the initial texture coordinates have been set are indicated with a large solid circle. As described above, processing of the remaining unset nodes may be performed on one node at a time in order of increasing distance to the origin. FIG. 5C illustrates that the next node to be processed ($I_2$) is designated as N0. When processing this node, the nearest neighbor that is set is $I_1$ (designated as N1 for this portion of the exercise) and the nearest neighbor of $I_1$ that is set is $I_0$ (designated as N2 for this portion of the exercise). As described above, the initial texture coordinates for $I_2$ (N0) may be computed dependent on the initial texture coordinates of $I_1$ (N1) and $I_0$ (N2), and on the vectors formed between nodes $I_2$ (N0), $I_1$ (N1), and $I_0$ (N2).

Figure 5D:
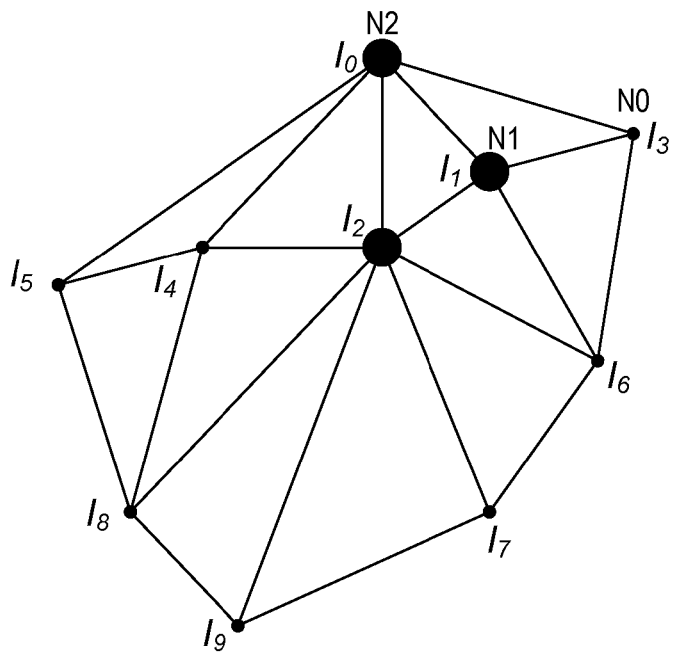

FIG. 5D illustrates the state of the exercise following the computation of initial texture coordinates for node $I_2$. In this figure, node $I_2$ is represented by a large, solid circle, indicating that its initial texture coordinates have been set. In this example, the next node to be processed is $I_3$, designated in FIG. 5D as N0. The nearest neighbor of $I_3$ that is set is $I_1$ (designated as N1 for this portion of the exercise) and the nearest neighbor of $I_1$ that is set is $I_0$ (designated as N2 for this portion of the exercise). The initial texture coordinates for $I_3$ may be computed dependent on the initial texture coordinates of $I_1$ (N1) and $I_0$ (N2), and on the vectors formed between nodes $I_3$ (N0), $I_1$ (N1), and $I_0$ (N2), as described above.

Figure 5E:
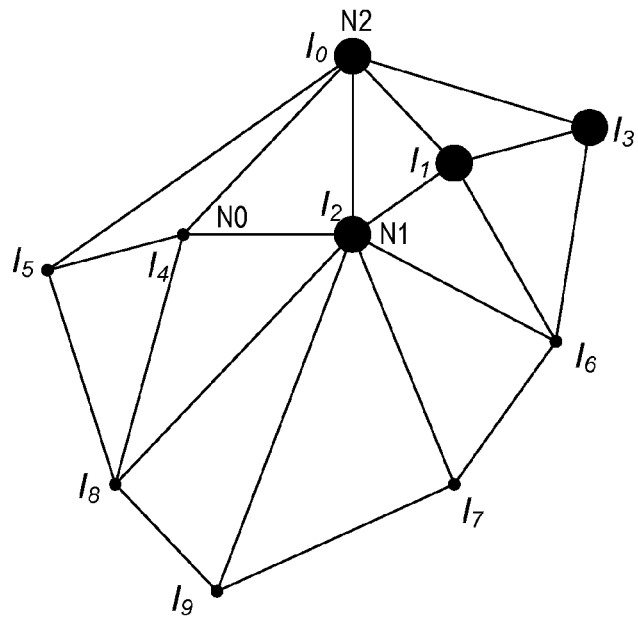
Figure 5F:
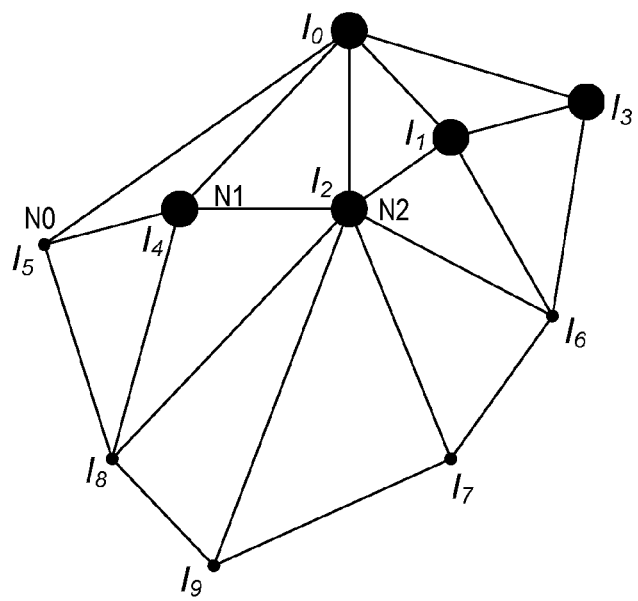

FIG. 5E illustrates the state of the exercise following the computation of initial texture coordinates for node $I_3$. In this figure, node $I_3$ is represented by a large, solid circle, indicating that its initial texture coordinates have been set. In this example, the next node to be processed is $I_4$ (designated as N0 for this portion of the exercise). The nearest neighbor of $I_4$ that is set is $I_2$ (designated as N1 for this portion of the exercise), and the nearest neighbor of $I_2$ that is set is $I_0$ (designated as N2 for this portion of the exercise). The initial texture coordinates for $I_4$ may be computed dependent on the initial texture coordinates of $I_2$ (N1) and $I_0$ (N2), and on the vectors formed between nodes $I_4$ (N0), $I_2$ (N1), and $I_0$ (N2), as described above. Similarly, FIG. 5F illustrates the designation of nodes $I_5$, $I_4$, and $I_2$ as N0, N1, and N2, respectively, for the processing of the next node in order of distance to the origin, which is I. The operations described above may be repeated to compute initial texture coordinates for the remaining nodes of the surface mesh portion illustrated in FIGS. 5A-5F (e.g., nodes $I_5$-$I_9$).

Note that processing the nodes of the surface mesh in order of their distance from the origin, as described above, guarantees the existence of N1 and N2. In other words, because the nodes are processed in this order, every node whose texture coordinates have not yet been set (other than the origin node itself) must have a neighbor whose texture coordinates have already been set, and every node (other than the origin) whose texture coordinates have already been set must also have a neighbor whose texture coordinates have already been set. Note that in some embodiments, in order for the rotation operation applied to T1 to be performed correctly, the surface mesh may be required to be consistently orientated.

In some cases, the initial 2D texture coordinates generating using a dead reckoning type operation, as described above, may be perfectly adequate for use in applying a texture to a 3D surface mesh that include only external curvature, such as a cylinder, or flag waving in the wind. However, when these initial texture coordinates are used in applying a texture to a 3D surface mesh that includes intrinsic curvature, the resulting image may exhibit some amount of built-up numerical error and/or distortions due to stretching and/or compression.

As described above, a revised set of texture coordinates may be generated by computing a conformal map for the surface mesh, using the initial texture coordinates (e.g., those generated using the dead reckoning technique described above) as inputs to the computation. Linear solvers, such as those typically applied to a conformal mapping operation, generally benefit from a good initial estimate. In some embodiments, using the texture coordinates of the previous phase as an estimate for the starting point in generating a conformal mapping may yield better results and/or may cause the conformal mapping solution to converge more quickly (i.e. achieving a given accuracy in fewer iterations) than previous conformal optimization techniques. By contrast, previous conformal mapping techniques are typically initialized with a default or constant function, such as (0,0).

One method for generating a revised set of texture coordinates from initial texture coordinates is illustrated in FIG. 6. As shown in this example, the method may include accessing data representing an initial 2D texture coordinate mapping for a 3D surface mesh, as in 600. In some embodiments, a conformal map for an arbitrary simplicial complex may be generated by solving the discrete Beltrami-Laplace equation at each node within the mesh. Therefore, the method may include determining the Beltrami-Laplace equation at each node within the mesh, as in 610. Taken together (and with careful consideration of any imposed and natural boundary conditions) these equations may generate a set of linear simultaneous equations whose solution is a 2D texture coordinate pair at every node within the 3D surface mesh. Since these equations are linear, sparse, and positive definite, they may be solved relatively easily and quickly for even large systems.

Iterative solvers provide a way of converging an initial estimate towards one that is increasingly accurate within the constraints of finite precision arithmetic. As illustrated in 620 of FIG. 6, the method may include applying an iterative linear solver to the set of simultaneous equations to generate a conformal mapping solution. For example, in some embodiments, the method may employ a Preconditioned Conjugate Gradient based solver with a Symmetric Successive Over-Relaxation (SSOR) iteration used as the pre-conditioner. As illustrated by decision block 630 and the feedback to 620 in FIG. 6, the solver may be repeatedly applied until the results are acceptable or until a pre-determined limit on the iterative process is reached. In practice, it has been found that a relatively small number of iterations (e.g., as few as 5) may be necessary to "iron out" any local and hence more obvious defects in the texture map.

In some embodiments, a measure of the accuracy of the solution may be obtained in terms of a normalized residual vector, and the iterative solver may be configured to terminate when this reaches a preset value. In other embodiments, the method may observe a predetermined limit on the number of iterations, or a predetermined limit on the amount of time allocated to generating a conformal mapping (e.g., if trying to solve in real time). In various embodiments, these limits on the application of the solver to the set of simultaneous equations may be implemented as fixed parameter values, or may be implemented as user-configurable parameters. Once acceptable results have been achieved and/or one of these limits has been reached, shown as the positive exit from 630, the method may include storing data representing the refined set of 2D texture coordinates of the conformal mapping solution, as in 640. As previously noted, in some embodiments, the revised texture coordinates may be used in a texture mapping operation, or may be provided to various graphics applications along with other metadata associated with the 3D object image data, including the data representing the surface mesh model of the 3D object.

As previously noted, while a conformal texture coordinate mapping solution is guaranteed to be a bijection and to result in a consistent orientation when applying the texture to the object, the result may include some amount of stretching when a texture is applied to a 3D surface mesh exhibiting intrinsic curvature. Achieving a texture mapping that minimizes stretch and compression type distortions may in some embodiments require the solution of a set of non-linear simultaneous equations. In general, this may be numerically much more difficult than the linear case, since there can be many local minima in which an iterative solver may become "trapped". Unfortunately, the majority of these local solutions may not consist of smooth bijections, and they may not be consistently oriented. Thus, they may look very unnatural. To overcome these problems, the texture coordinate generation method may in some embodiments combine terms for stretch/compression minimization with the previously described Laplacian terms. This, together with the use of a good initial guess (using the canonical dead reckoning technique and conformal mapping techniques described above), may drive the solution towards a bijection, while the added isometric terms may act to minimize stretching and compression of the texture. In some embodiments, the result of this approach may be a natural looking texture distribution.

One method for generating 2D texture coordinates for 3D surface meshes having both intrinsic and external curvature is illustrated in FIG. 7. As illustrated in this example, the method may include accessing data representing an intermediate conformal mapping solution generated by solving simultaneous linear equations of a 3D surface mesh, as in 700. The method may include introducing non-linear terms into the set of simultaneous equations on which a non-linear solver is to be applied, as in 710. These non-linear terms may represent elastic equations as applied to the 3D surface mesh. For example, in some embodiments the method may include creating a functional measure of stretch (i.e. elastic energy) along each edge (e.g., dependent on the difference, or delta, between the lengths of each edge in the 2D mapping and the corresponding edge in the 3D surface mesh), and then minimizing the sum of those deltas squared (i.e., in a least squares sense), to get as close as possible to an isometric solution.

The introduction of these non-linear isometric terms into the simultaneous equations to be solved (but not too early) may in some embodiments act to reduce distortion due to compression and/or stretching of the texture map by further refinement of the 2D texture coordinates to account for intrinsic curvature of the surface mesh. In some embodiments, the terms may be added incrementally, after converging on a good or perfect conformal mapping, as described above.

As illustrated in 720 of FIG. 7, the method may include applying an iterative non-linear solver to the set of simultaneous equations to generate a further refined texture coordinate mapping that approaches an isometric solution. This refined mapping may in some embodiments reduce distortions due to intrinsic curvature. As illustrated by decision block 730 and the feedback to 720 in FIG. 7, the solver may be repeatedly applied until the results are acceptable. Once acceptable results have been achieved, shown as the positive exit from 730, the method may include storing data representing the further refined set of 2D texture coordinates of the mapping, as in 740. As previously noted, in some embodiments, the further refined texture coordinates may be used in a texture mapping operation, or may be provided to various graphics applications along with other metadata associated with the 3D object image data, including the data representing the surface mesh model of the 3D object.

As described above, while a perfectly isometric mapping may not be possible for 3D surfaces that include intrinsic curvature, the methods described herein may approach an isometric solution such that the results of attaching a texture map to an object using the computed 2D texture coordinates may be visually pleasing (i.e. may include few seams, few distortions due to stretching or compression, and a consistent orientation of the applied texture map). In various embodiments, the combination of the dead reckoning type operation described herein with the conformal mapping technique and/or isometric mapping technique described herein may yield visually pleasing results.

Note that in various embodiments, the methods described herein for generating 2D texture coordinates for a 3D surface mesh may be applied to all of the nodes of the surface mesh (one at a time) as part of a single exercise, or the method may be applied to one or more subsets of the nodes in separate exercises performed serially or in parallel (e.g., on multiple CPUs or GPUs).

Figure 8:
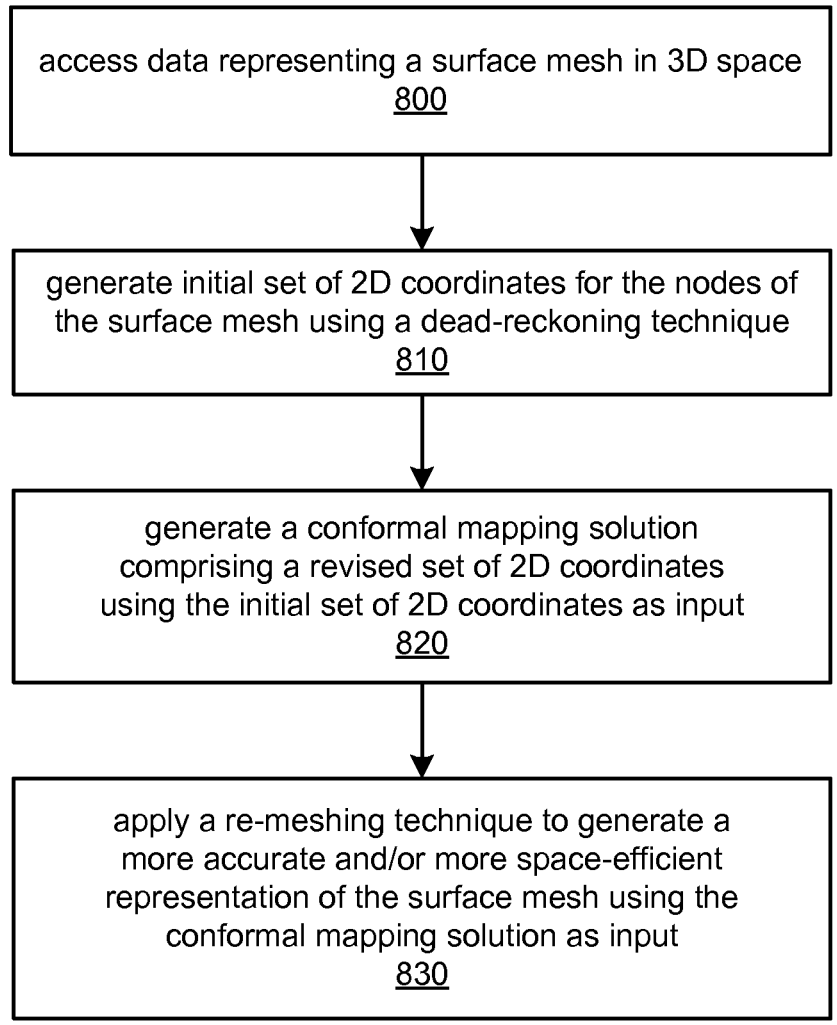
FIG. 8 is a flow diagram illustrating a method for re-meshing a 3D surface representation, according to some embodiments.

As previously noted, in some embodiments, the methods described herein may be applied to a re-meshing operation. For example, a conformal map may in some embodiments provide a useful starting point for a re-meshing operation. FIG. 8 illustrates a method for performing a re-meshing operation that leverages the conformal mapping techniques described herein, according to one embodiment. As illustrated in this example, the method may include accessing data representing a surface mesh in 3D space, as in 800. For example, the data (which may consist of data representing various nodes, edges, and triangles) may be generated using a 3D scanner. In some cases, a 3D scanner may generate a very messy surface mesh, e.g., one having a large number of small edges, faces, and triangles, one having a large number of irregular triangles, and/or one that may not compress well. In some embodiments, such a messy surface mesh may be "cleaned up" using a method similar to that illustrated in FIG. 8 such that it includes the minimum number of triangles that faithfully represents the 3D surface (according to a default or user-specified tolerance for error). As illustrated in FIG. 8, the method may include generating an initial set of 2D texture coordinates for the nodes of the surface mesh, as in 810. For example, in some embodiments the initial set of 2D texture coordinates may be generated using the dead reckoning type operation illustrated in FIGS. 4A-4B and described above.

As illustrated in 820 of FIG. 8, the method may include generating a conformal mapping solution comprising a revised set of 2D texture coordinates, using the initial set of 2D texture coordinates as input. For example, in some embodiments the conformal mapping solution may be generated using the method illustrated in FIG. 6 and described above. As described above, a conformal mapping provides a very consistent coordinate system for a surface, which may facilitate a re-meshing operation for the surface. For example, a conformal mapping operation may be used to map the messy surface mesh to the plane, providing a consistent map on which to apply a re-meshing technique. As illustrated in 830 of FIG. 8, the method may include applying a re-meshing technique to the conformal mapping to generate a more accurate and/or more space-efficient representation of the input surface mesh using the conformal mapping result as input. For example, in some embodiments a Delaunay triangulation technique may be applied to the conformal mapping result to re-mesh the surface. In other embodiments, any suitable standard or custom re-meshing technique may be applied to the conformal mapping result in order to re-mesh the surface.

Figure 9:
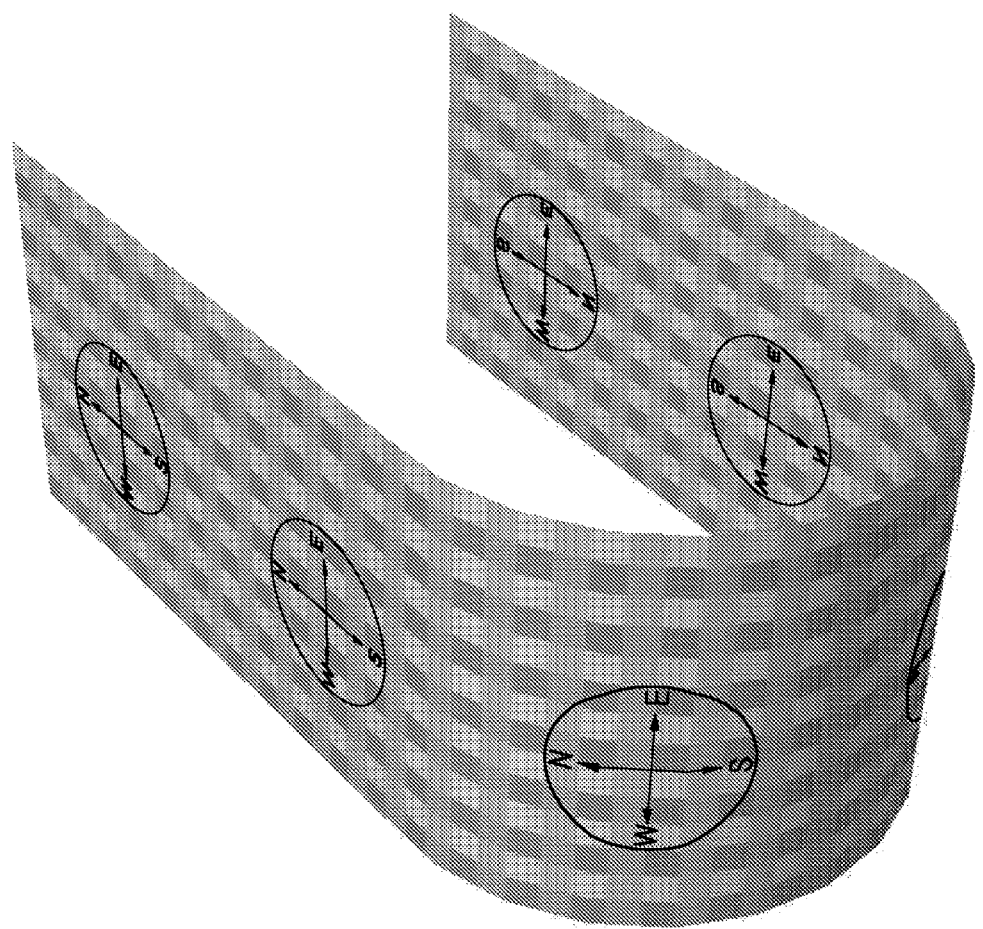
FIG. 9 illustrates a 2D representation of a 3D surface generated using a dead reckoning type operation, according to some embodiments.

The methods described herein may be used to generate 2D texture coordinates for a 3D surface mesh that when used in attaching a texture map to a 3D object produce a natural and pleasing visual result. FIGS. 9 and 10A-10C illustrate sample results for the application of a texture to objects having only external curvature or with intrinsic curvature. The illustrated objects and textures are similar to those illustrated in FIGS. 1A-1B and 2A-2B. Specifically, the images illustrated in FIGS. 9 and 10A were generated using the dead reckoning type operation described herein. As can be seen in FIG. 9, the dead reckoning type operation described herein may generate 2D texture coordinates that yield a more natural looking result when used to attach a texture map to the 3D surface than a texture mapping based on planar projection, such as those illustrated in FIGS. 1A and 1B. The attached texture in the image illustrated in FIG. 9 has no seams, exhibits very little distortion due to curvature, and is a consistently oriented across the surface (as shown by the consistently oriented compass symbols of the attached texture maps).

Figure 10A:
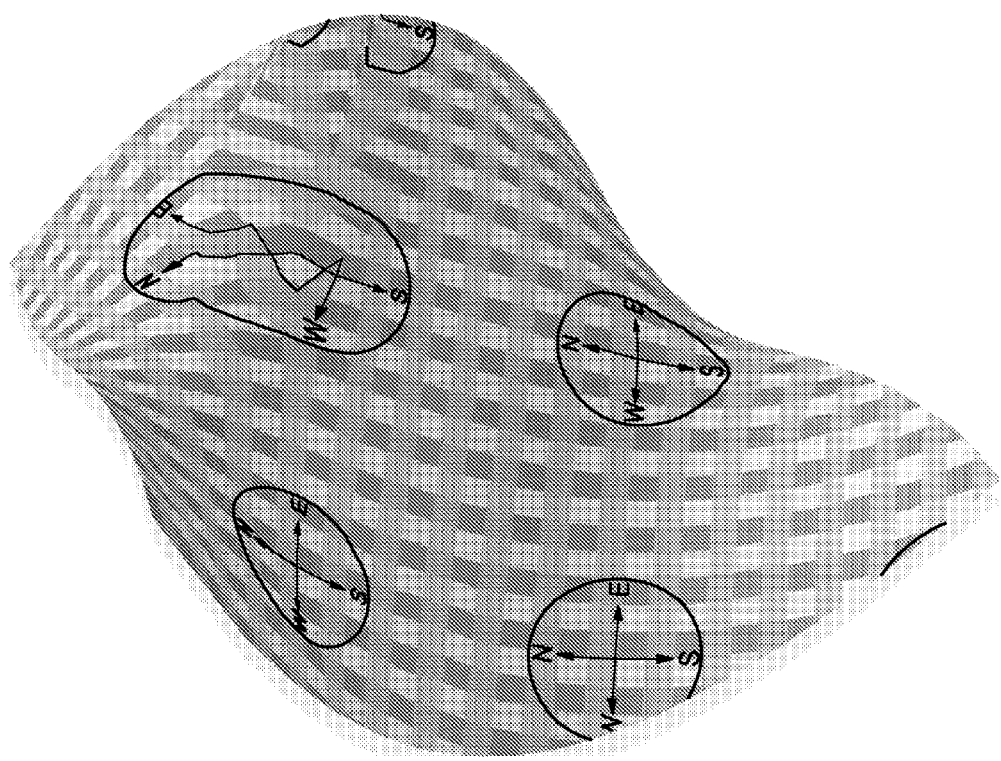
FIG. 10A illustrates a 2D representation of a 3D surface generated using a dead reckoning type operation, according to some embodiments.
Figure 10B:
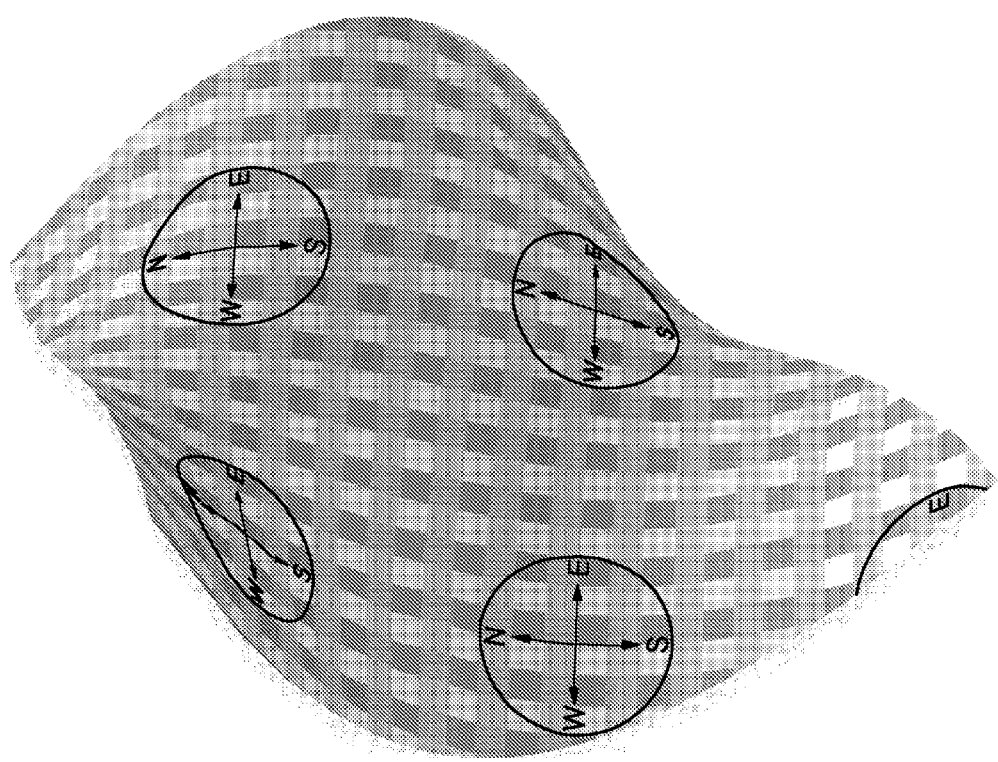
FIG. 10B illustrates a 2D representation of a 3D surface generated using a dead reckoning type operation as an input to a conformal mapping solution, according to some embodiments.
Figure 10C:
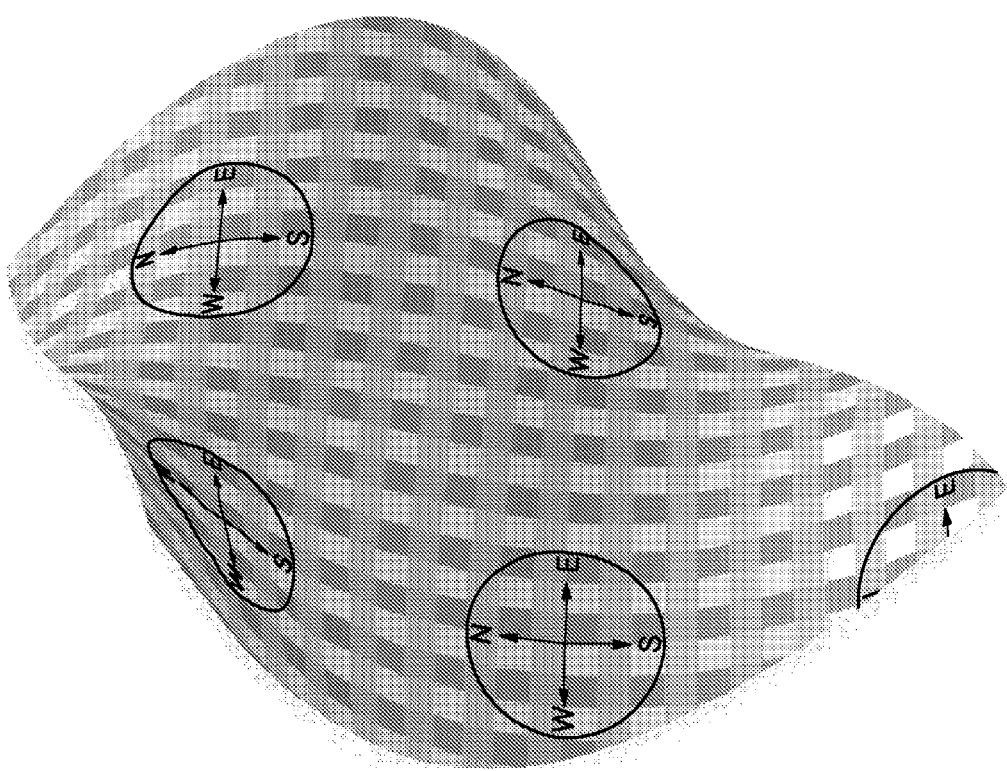
FIG. 10C illustrates a 2D representation of a 3D surface generated using a dead reckoning type operation, a conformal mapping operation, and the addition of isometric terms, according to some embodiments.

Similarly, the image illustrated in FIG. 10A includes fewer seams and a more consistent texture orientation than those illustrated in FIGS. 2A and 2B. The image illustrated in FIG. 10B was generated using a combination of the dead reckoning type operation described herein and additional iterations described herein for conformal optimization. As can be seen in this figure, the addition of terms for conformal optimization may result in an image having fewer seams and distortions due to external curvature than those illustrated in FIGS. 2A, 2B, and 10A. The image illustrated in FIG. 10C was generated using a combination of the dead reckoning type operation described herein and additional iterations described herein for isometric optimization. As can be seen in this figure, the addition of terms for isometric optimization may result in an image having fewer distortions due to stretching and compression than those illustrated in FIGS. 2A, 2B, 10A, and 10B.

Some embodiments of the system described herein may include a means for assigning 2D texture coordinates to each node of a 3D surface mesh using a dead reckoning type operation. For example, a dead reckoning module may determine the shortest distance between a designated origin node and each other node within the surface mesh, and compute texture coordinates for each node in order of its distance to the origin dependent on the distance and direction of a vector to a neighbor node to which texture coordinates have already been assigned and the distance and direction from that neighbor node to one of its neighbor nodes to which texture coordinates have already been assigned, as described in detail herein. The dead reckoning module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform determining the shortest distance between a designated origin node and each other node within the surface mesh, and computing texture coordinates for each node in order of its distance to the origin dependent on the distance and direction of a vector to a neighbor node to which texture coordinates have already been assigned and the distance and direction from that neighbor node to one of its neighbor nodes to which texture coordinates have already been assigned, as described in detail herein. In some embodiments, the dead reckoning module may also be configured to read a mesh and isolate a section of the mesh for which 2D texture coordinates are to be generated (e.g., a section on which a texture is to be applied). Other embodiments of the dead reckoning module may be at least partially implemented by hardware circuitry and/or firmware stored, for example, in a non-volatile memory.

Some embodiments of the system described herein may include a means for revising 2D texture coordinates for each node of a 3D surface mesh using a conformal mapping operation. For example, a conformal mapping module may access an initial set of 2D texture coordinates generated by a dead reckoning type operation, and apply a linear solver to simultaneous Beltrami-Laplace equations for each node within the surface mesh to generate revised 2D texture coordinates for each node within the surface mesh, as described in detail herein. The conformal mapping module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform accessing an initial set of 2D texture coordinates generated by a dead reckoning type operation, and applying a linear solver to simultaneous Beltrami-Laplace equations for each node within the surface mesh to generate revised 2D texture coordinates for each node within the surface mesh, as described in detail herein. Other embodiments of the conformal mapping module may be at least partially implemented by hardware circuitry and/or firmware stored, for example, in a non-volatile memory.

Some embodiments of the system described herein may include a means for further refining 2D texture coordinates for each node of a 3D surface mesh using an isometric mapping operation. For example, an isometric mapping module may access a revised set of 2D texture coordinates generated by a conformal mapping operation, introduce isometric terms representing elasticity into the simultaneous equations, and apply a non-linear solver to the equations to generate further refined 2D texture coordinates for each node within the surface mesh, as described in detail herein. The isometric mapping module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform accessing an revised set of 2D texture coordinates generated by a conformal mapping operation, introducing isometric terms representing elasticity into the simultaneous equations, and applying a non-linear solver to the equations to generate further refined 2D texture coordinates for each node within the surface mesh, as described in detail herein. Other embodiments of the conformal mapping module may be at least partially implemented by hardware circuitry and/or firmware stored, for example, in a non-volatile memory.

Some embodiments of the system described herein may include a means for re-meshing a 3D surface mesh dependent on a conformal mapping result. For example, a re-meshing module may access a revised set of 2D texture coordinates generated by a conformal mapping operation, and apply a triangulation operation to generate a revised 3D surface mesh, as described in detail herein. The re-meshing module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform accessing a revised set of 2D texture coordinates generated by a conformal mapping operation, and applying triangulation operation to generate a revised 3D surface mesh, as described in detail herein. Other embodiments of the re-meshing module may be at least partially implemented by hardware circuitry and/or firmware stored, for example, in a non-volatile memory.

In various embodiments, the methods described herein may be implemented as a component of a graphics application that provides graphics editing functionality, i.e. by program instructions that when executed in a computer system implement assigning 2D texture coordinates to the nodes of a 3D surface mesh. In some embodiments, such program instructions may comprise a "plug-in" module for such a graphics application, e.g., Adobe Photoshop™ or Adobe Photoshop Express™. Such a plug-in module may be configured to access and display the geometry of a 3D object from a file in a 3D graphics format (e.g., a PSD file), define a boundary of a section of a triangular mesh on which to apply a texture, and generate 2D textures for the section of the mesh using the techniques described herein. For example, the plug-in module may be configured to implement calculating the shortest path back to the origin through the triangular mesh for a dragged point (e.g., using Dijkstra's shortest path algorithm), determining an approximately isometric texture map for the mesh (i.e. one exhibiting minimum stretching), and then transferring this back to the graphics file representing the 3D image (e.g., a PSD file). Note that in various embodiments, geodesics may be useful in delineating the physical boundaries on a curved 3D surface. It has been shown that applying these methods to several 3D models produced good results for those models that meet the preferred topology. In addition, the methods have been applied to a very large (in terms of mesh detail) and complex model and have produced excellent results.

Figure 11:
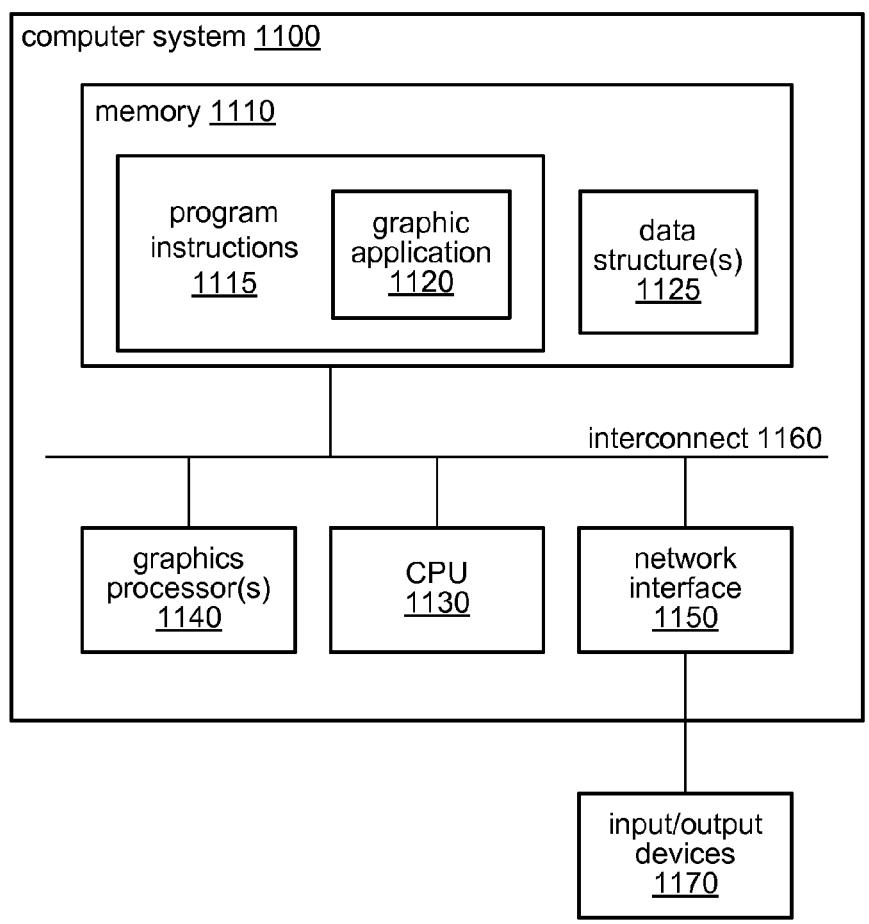
FIG. 11 illustrates a computer system configured to implement the techniques described herein, according to some embodiments.

The techniques described herein may be implemented by a computer system configured to provide the functionality described. FIG. 11 is a block diagram illustrating one embodiment of a computer system 1100 configured to implement the methods described herein. In different embodiments, computer system 1100 may be any of various types of devices, including, but not limited to, a personal computer system, desktop computer, laptop, notebook or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In some embodiments, a graphics editing program or other application (such as graphics application 1120) or a module of such an application may be configured to implement generating 2D texture coordinates for 3D surface meshes, as described herein. Graphics application 1120 may represent various types of graphics applications, such as painting, modeling, image editing, video editing, publishing, photography, games, animation, and other applications. In some embodiments, graphics application 1120 may utilize a graphics processor 1140 when rendering or displaying images. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1140 may implement a number of graphics primitive operations in a way that makes executing them much faster than drawing directly to the screen with a host central processing unit (CPU), such as CPU 1130. In various embodiments, the techniques described herein may be implemented by program instructions configured for parallel execution on two or more such GPUs. The GPU 1100 may implement one or more application programmer interfaces (APIs) that permit programmers to invoke the functionality of the GPU. Suitable GPUs may be commercially available from vendors such as NVIDIA Corporation, ATI Technologies, and others. Functionality and/or features described herein as being part of, or performed by, graphics application 1120 may, in some embodiments, be part of, or performed by, one or more graphics processors, such as graphics processor 1140.

Graphics application 1120, which may be configured to implement the techniques described herein, may be provided as a computer program product, or software, that may include a computer-readable storage medium having stored thereon instructions, which may be used to program a computer system (or other electronic devices) to implement the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 11, computer system 1100 may include one or more processor units (CPUs) 1130. Processors 1130 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1100, such as various versions of Unix, Linux, Windows™ from Microsoft Corporation, MacOS™ from Apple Corporation, or any other operating system that enables the operation of software on a hardware platform.

The computer system 1100 may also include one or more system memories 1110 (e.g., one or more of cache, SRAM, DRAM, RDRAM, EDO RAM, DDR RAM, SDRAM, Rambus RAM, EEPROM, or other memory type), or other types of RAM or ROM coupled to other components of computer system 1100 via interconnect 1160. Memory 1110 may include other types of memory as well, or combinations thereof. One or more of memories 1110 may include program instructions 1115 executable by one or more of processors 1130 to implement various aspects of the methods described herein. Program instructions 1115, which may include program instructions configured to implement graphics application 1120, may be partly or fully resident within the memory 1110 of computer system 1100 at any point in time. Alternatively, program instructions 1115 may be provided to GPU 1140 for performing functionality described herein. In some embodiments, the techniques described herein may be implemented by a combination of program instructions 1115 executed on one or more processors 1130 and one or more GPUs 1140, respectively. Program instructions 1115 may also be stored on an external storage device (not shown) accessible by the processor(s) 1130 and/or GPU 1140, in some embodiments. Any of a variety of such storage devices may be used to store the program instructions 1115 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1130 and/or GPU 1140 through one or more storage or I/O interfaces including, but not limited to, interconnect 1160 or network interface 1150, as described herein. In some embodiments, the program instructions 1115 may be provided to the computer system 1100 via any suitable computer-readable storage medium including memory 1110 and/or external storage devices described above. Memory 1110 may also be configured to implement one or more data structures 1125, such as one or more data structures configured to store data representing one or more input images, output images, intermediate images, 3D surface meshes, texture maps, and/or sets of 2D texture coordinates. In some embodiments, data structures 1125 may be configured to store values of one or more user-configurable parameters, such as a number of iterations allocated for a solver, a maximum compute time allocated to a solver, a minimum accuracy threshold for a solver, or an optimization preference (e.g. conformal or isometric). Data structures 1125 may be accessible by processor(s) 1130 and/or GPU 1140 when executing graphics application 1120 or other program instructions 1115.

As shown in FIG. 11, processor(s) 1130 may be coupled to one or more of the other illustrated components by at least one communications bus, such as interconnect 1160 (e.g., a system bus, LDT, PCI, ISA, or other communication bus type), and a network interface 1150 (e.g., an ATM interface, an Ethernet interface, a Frame Relay interface, or other interface). The CPU 1130, the network interface 1150, and the memory 1110 may be coupled to the interconnect 1160. It should also be noted that one or more components of system 1100 might be located remotely and accessed via a network.

As noted above, in some embodiments, memory 1110 may include program instructions 1115, comprising program instructions configured to implement graphics application 1120, as described herein. Graphics application 1120 may be implemented in various embodiments using any desired programming language, scripting language, or combination of programming languages and/or scripting languages, e.g., C, C++, C#, Java™, Perl, etc. For example, in one embodiment, graphics application 1120 may be JAVA based, while in another embodiments, it may be implemented using the C or C++ programming languages. In other embodiments, graphics application 1120 may be implemented using specific graphic languages specifically for developing programs executed by specialize graphics hardware, such as GPU 1140. In addition, graphics application 1120 may be embodied on memory specifically allocated for use by graphics processor(s) 1140, such as memory on a graphics board including graphics processor(s) 1140. Thus, memory 1110 may represent dedicated graphics memory as well as general-purpose system RAM, in various embodiments. Memory 1110 may in some embodiments also include a data store configured to store image data for one or more input images, output images, or texture maps, as well as metadata associated with those images, such as data representing 3D surface meshes and/or 2D texture coordinates. Other information not described herein may be included in memory 1110 and may be used to implement the methods described herein and/or other functionality of computer system 1100.

Network interface 1150 may be configured to enable computer system 1100 to communicate with other computers, systems or machines, such as across a network. Network interface 1150 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1100 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1150 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1140 may be implemented in a number of different physical forms. For example, GPU 1140 may take the form of a dedicated graphics card, an integrated graphics solution and/or a hybrid solution. GPU 1140 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 11, memory 1110 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1140 and the rest of the computer system 1100 may travel through a graphics card slot or other interface, such as interconnect 1160 of FIG. 11.

Computer system 1100 may also include one or more additional I/O interfaces, such as interfaces for one or more user input devices 1170, or such devices may be coupled to computer system 1100 via network interface 1150. For example, computer system 1100 may include interfaces to a keyboard, a mouse or other cursor control device, a joystick, or other user input devices 1170, in various embodiments. Additionally, the computer system 1100 may include one or more displays (not shown), coupled to processors 1130 and/or other components via interconnect 1160 or network interface 1150. Such input/output devices may be configured to allow a user to interact with graphics application 1120 to perform various image processing functions described herein and/or to specify various parameters, thresholds, and/or other configurable options available to the user when using graphic application 1120. For example, such input/output devices may be configured to allow a user to select (e.g., through a graphical user interface) a surface mesh representation of a 3D object and to selectively attach a chosen texture map to the object, in accordance with 2D texture coordinates generated using the methods described herein, or to specify a value for one or more of: a number of iterations allocated for a solver, a maximum compute time allocated to a solver, a minimum accuracy threshold for a solver, or an optimization preference (e.g. conformal or isometric). It will be apparent to those having ordinary skill in the art that computer system 1100 may also include numerous other elements not shown in FIG. 11.

Note that program instructions 1115 may be configured to implement a graphic application 1120 as a stand-alone application, or as a module of another graphics application or graphics library, in various embodiments. For example, in one embodiment program instructions 1115 may be configured to implement graphics applications such as painting, editing, publishing, photography, games, animation, and/or other applications, and may be configured to provide the functionality described herein. In another embodiment, program instructions 1115 may be configured to implement the techniques described herein in one or more functions or modules called by another graphics application executed on GPU 1140 and/or processor(s) 1130 (e.g., a dead reckoning module, a conformal mapping module, an isometric mapping module, or a re-meshing module). These modules may be executable on one or more of CPUs 1130 and/or GPUs 1140 to cause computer system 1100 to provide the functionality described herein. Program instructions 1115 may also be configured to render images and present them on one or more displays as the output of an operation and/or to store image data in memory 1110 and/or an external storage device(s), in various embodiments.

While various techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the description be interpreted to embrace all such variations and modifications.

What is claimed is:

1. A computer-implemented method, comprising:
    accessing, by a computing device, data representing a surface mesh model of a three-dimensional object;
    assigning, by the computing device, initial two-dimensional texture coordinates to each node within the surface mesh using a mapping technique in which computing the texture coordinates of each node other than an origin node is dependent on a distance and direction of a vector formed between the node and a neighbor node within the surface mesh to which texture coordinates have previously been assigned, the assigning including computing texture coordinates for each given node other than the origin node and a nearest neighbor of the origin node by:
    identifying a nearest neighbor of the given node to which texture coordinates have been assigned;
    identifying a nearest neighbor of the nearest neighbor to which texture coordinates have also been assigned; and
    computing the texture coordinates of the given node dependent on the texture coordinates of the nearest neighbor and the texture coordinates of the nearest neighbor of the nearest neighbor;
    computing, by the computing device, a conformal mapping solution to generate revised two-dimensional coordinates for each node within the surface mesh, wherein said computing is based on the assigned initial two-dimensional texture coordinates; and
    storing the revised two-dimensional texture coordinates for subsequent use in a graphics application.

2. The method of claim 1, wherein said assigning comprises:
    designating a given node of the surface mesh as the origin node;
    determining a respective distance from each node within the surface mesh other than the origin node to the origin node on a shortest path to the origin node along one or more edges of the surface mesh;
    determining an ordering of nodes within the surface mesh such that the nodes are ordered in terms of increasing distance to the origin node; and
    computing texture coordinates for each node other than the origin node in the determined order.

3. The method of claim 1, wherein said computing a conformal mapping solution comprises applying an iterative linear solver to simultaneous Beltrami-Laplace equations for each node within the mesh.

4. The method of claim 3, wherein said computing a conformal mapping solution comprises applying the iterative linear solver until a pre-determined number of iterations have been performed, a pre-determined period of time has passed, or a pre-determined measure of accuracy has been reached.

5. The method of claim 3, further comprising, subsequent to said computing a conformal mapping solution:
    introducing one or more isometric terms representing stretching or compression within the surface mesh into the set of simultaneous equations; and applying a non-linear solver to the set of simultaneous equations to generate further refined two-dimensional texture coordinates for each node within the surface mesh.

6. The method of claim 1, further comprising:
using the computer to perform a re-meshing operation to generate a modified surface mesh model of the three-dimensional object, wherein the re-meshing operation takes the conformal mapping solution as an input.

7. The method of claim 6, wherein the re-meshing operation comprises a triangulation operation.

8. The method of claim 1, further comprising:
using the computer to perform attaching a texture represented by a two-dimensional texture map to the three-dimensional object according to the initial two-dimensional texture coordinates or the revised two-dimensional texture coordinates for each node; and
rendering an image comprising the three-dimensional object in which the texture is attached to the surface of the three-dimensional object.

9. The method of claim 1, further comprising:
the computer receiving input indicating that a texture map is to be applied to the three-dimensional object;
wherein said accessing, said assigning, said computing, and said storing are performed in response to said receiving.

10. The method of claim 1, further comprising, prior to said assigning initial two-dimensional texture coordinates:
pre-processing the data representing the surface mesh model to produce a modified surface mesh that is well-oriented, non-degenerative, and simplicial.

11. A non-transitory, computer-readable storage medium storing program instructions computer-executable to implement:
accessing data representing a surface mesh model of a three-dimensional object;
assigning initial two-dimensional texture coordinates to each node within the surface mesh using a mapping technique in which computing the texture coordinates of each node other than an origin node is dependent on a distance and direction of a vector formed between the node and a neighbor node within the surface mesh to which texture coordinates have previously been assigned, the assigning including computing the texture coordinates for each given node other than the origin node and a nearest neighbor of the origin node by:
identifying a nearest neighbor of the given node to which texture coordinates have been assigned;
identifying a nearest neighbor of the nearest neighbor to which texture coordinates have also been assigned; and
computing the texture coordinates of the given node dependent on the texture coordinates of the nearest neighbor and the texture coordinates of the nearest neighbor of the nearest neighbor;
computing a conformal mapping solution to generate revised two-dimensional coordinates for each node within the surface mesh based on the assigned initial two-dimensional texture coordinates; and
storing the revised two-dimensional texture coordinates for subsequent use in a graphics application.

12. The non-transitory, computer-readable storage medium of claim 11, wherein said assigning comprises:
designating a given node of the surface mesh as the origin node;
determining a respective distance from each node within the surface mesh other than the origin node to the origin node on a shortest path to the origin node along one or more edges of the surface mesh;
determining an ordering of nodes within the surface mesh such that the nodes are ordered in terms of increasing distance to the origin node; and
computing texture coordinates for each node other than the origin node in the determined order.

13. The non-transitory, computer-readable storage medium of claim 11, wherein said computing a conformal mapping solution comprises applying an iterative linear solver to simultaneous Beltrami-Laplace equations for each node within the mesh until a pre-determined number of iterations have been performed, a pre-determined period of time has passed, or a pre-determined measure of accuracy has been reached.

14. The non-transitory, computer-readable storage medium of claim 13, wherein the program instructions are further computer-executable to implement, subsequent to said computing a conformal mapping solution:
introducing one or more isometric terms representing stretching or compression within the surface mesh into the set of simultaneous equations; and
applying a non-linear solver to the set of simultaneous equations to generate further refined two-dimensional texture coordinates for each node within the surface mesh.

15. The non-transitory, computer-readable storage medium of claim 11, wherein the program instructions are further computer-executable to implement:
performing a re-meshing operation to generate a modified surface mesh model of the three-dimensional object, wherein the re-meshing operation takes the conformal mapping solution as an input.

16. The non-transitory, computer-readable storage medium of claim 11, wherein the program instructions are further computer-executable to implement:
attaching a texture represented by a two-dimensional texture map to the three-dimensional object according to the initial two-dimensional texture coordinates or the revised two-dimensional texture coordinates for each node; and
rendering an image comprising the three-dimensional object in which the texture is attached to the surface of the three-dimensional object.

17. A system, comprising:
one or more processors; and
a memory medium coupled to the one or more processors and storing program instructions executable by the one or more processors to implement:
accessing data representing a surface mesh model of a three-dimensional object;
assigning initial two-dimensional texture coordinates to each node within the surface mesh using a mapping technique in which computing the texture coordinates of each node other than an origin node is dependent on a distance and direction of a vector formed between the node and a neighbor node within the surface mesh to which texture coordinates have previously been assigned, the assigning including computing texture coordinates for each given node other than the origin node and a nearest neighbor of the origin node by:
identifying a nearest neighbor of the given node to which texture coordinates have been assigned;
identifying a nearest neighbor of the nearest neighbor to which texture coordinates have also been assigned; and computing the texture coordinates of the given node dependent on the texture coordinates of the nearest neighbor and the texture coordinates of the nearest neighbor of the nearest neighbor;

computing a conformal mapping solution to generate revised two-dimensional coordinates for each node within the surface mesh based on the assigned initial two-dimensional texture coordinates; and storing the revised two-dimensional texture coordinates for subsequent use in a graphics application.

18. The system of claim 17, wherein said assigning comprises:

designating a given node of the surface mesh as the origin node;

determining a respective distance from each node within the surface mesh other than the origin node to the origin node on a shortest path to the origin node along one or more edges of the surface mesh;

determining an ordering of nodes within the surface mesh such that the nodes are ordered in terms of increasing distance to the origin node; and computing texture coordinates for each node other than the origin node in the determined order.

19. The system of claim 17, wherein said computing a conformal mapping solution comprises applying an iterative linear solver to simultaneous Beltrami-Laplace equations for each node within the mesh until a pre-determined number of iterations have been performed, a pre-determined period of time has passed, or a pre-determined measure of accuracy has been reached.

20. The system of claim 19, wherein the program instructions are further executable by the one or more processors to implement, subsequent to said computing a conformal mapping solution:

introducing one or more isometric terms representing stretching or compression within the surface mesh into the set of simultaneous equations; and applying a non-linear solver to the set of simultaneous equations to generate further refined two-dimensional texture coordinates for each node within the surface mesh.

21. The system of claim 17, wherein the program instructions are further executable by the one or more processors to implement:

performing a re-meshing operation to generate a modified surface mesh model of the three-dimensional object, wherein the re-meshing operation takes the conformal mapping solution as an input.

22. The system of claim 17, wherein the program instructions are further executable by the one or more processors to implement:

attaching a texture represented by a two-dimensional texture map to the three-dimensional object according to the initial two-dimensional texture coordinates or the revised two-dimensional texture coordinates for each node; and rendering an image comprising the three-dimensional object in which the texture is attached to the surface of the three-dimensional object.

23. The system of claim 17, wherein the one or more processors comprise at least one of: a general-purpose central processing unit (CPU) or a graphics processing unit (GPU).

* * * * *